US012567029B2

(12) United States Patent
Robinette et al.

(10) Patent No.: US 12,567,029 B2
(45) Date of Patent: *Mar. 3, 2026

(54) INFORMATION TECHNOLOGY ECOSYSTEM ENVIRONMENT FOR GENERATING SUSTAINABILITY INFORMATION FOR USE WHEN INTEGRATING SUSTAINABILITY AND INFORMATION TECHNOLOGY PLANNING

(71) Applicant: Dell Products L.P., Round Rock, TX (US)

(72) Inventors: Christopher A. Robinette, Fremont, OH (US); David O. Garner, Cedar Park, TX (US); John E. Jenne, Georgetown, TX (US); Vivek Viswanathan Iyer, Saint Johns, FL (US); Karthik Suryanarayanan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 572 days.

This patent is subject to a terminal disclaimer.

(21) Appl. No.: 17/946,881

(22) Filed: Sep. 16, 2022

(65) Prior Publication Data

US 2024/0095663 A1     Mar. 21, 2024

(51) Int. Cl.
G06Q 10/06 (2023.01)
G06N 5/04 (2023.01)
(Continued)

(52) U.S. Cl.
CPC .................................. G06Q 10/087 (2013.01)

(58) Field of Classification Search
CPC .................................................. G06Q 10/087
See application file for complete search history.

(56) References Cited

U.S. PATENT DOCUMENTS 7,945,902 B1   5/2011 Sahoo
8,447,569 B1   5/2013 Marwah et al.
(Continued)

FOREIGN PATENT DOCUMENTS

CN          114640897 A     6/2022
WO       2005038613 A2     4/2005
(Continued)

OTHER PUBLICATIONS

List of Patents or Applications Treated as Related, Oct. 2022.
(Continued)

*Primary Examiner* — Talia F Crawley
(74) *Attorney, Agent, or Firm* — Terrile, Cannatti & Chambers, LLP; Stephen A. Terrile

(57)               ABSTRACT

A system, method, and computer-readable medium for performing an information technology (IT) ecosystem management and monitoring operation. The IT ecosystem management and monitoring operation includes: providing a sustainability application to an information handling system, the information handling system being located within an IT ecosystem; obtaining sustainability information regarding the information handling system via the sustainability application; providing an IT ecosystem monitoring and management console, the IT ecosystem monitoring and management console comprising an IT ecosystem sustainability system, the IT ecosystem sustainability system comprising a sustainability component; and, communicating between the sustainability component and the sustainability application to perform an IT inventory sustainability planning operation, the communicating providing the sustainability component with the sustainability information regarding the information handling system.

20 Claims, 20 Drawing Sheets

(51) Int. Cl.

| | |
|---|---|
| G06N 20/00 | (2019.01) |
| G06Q 10/08 | (2024.01) |
| G06Q 10/087 | (2023.01) |

(56) References Cited

U.S. PATENT DOCUMENTS

| | | | |
|---|---|---|---|
| 9,392,720 | B1 | 7/2016 | Kim |
| 9,619,649 | B1 | 4/2017 | Yun |
| 10,375,172 | B2 | 8/2019 | Bugenhagen et al. |
| 10,671,510 | B1 | 6/2020 | Willson et al. |
| 10,739,027 | B2 | 8/2020 | Abiprojo et al. |
| 10,782,990 | B1 | 9/2020 | Suarez et al. |
| 11,144,038 | B2 | 10/2021 | Stump et al. |
| 11,144,289 | B1* | 10/2021 | Hwang .................. G06F 8/443 |
| 11,243,515 | B2 | 2/2022 | Dipert et al. |
| 11,461,218 | B1 | 10/2022 | Malamut et al. |
| 11,503,061 | B1 | 11/2022 | Lin et al. |
| 11,665,080 | B2 | 5/2023 | Gal et al. |
| 2005/0033600 | A1 | 2/2005 | Geddes et al. |
| 2005/0278202 | A1* | 12/2005 | Broomhall ....... G06Q 10/06316 |
| | | | 705/7.17 |
| 2006/0235778 | A1 | 10/2006 | Razvi et al. |
| 2007/0288286 | A1 | 12/2007 | Linehan |
| 2009/0201293 | A1 | 8/2009 | Tung et al. |
| 2009/0307094 | A1 | 12/2009 | Manos |
| 2010/0250298 | A1 | 9/2010 | Channabasavaiah et al. |
| 2010/0274639 | A1 | 10/2010 | Tsuji et al. |
| 2010/0306056 | A1 | 12/2010 | Rego |
| 2010/0318658 | A1 | 12/2010 | Zorn et al. |
| 2011/0087522 | A1 | 4/2011 | Beaty et al. |
| 2011/0313808 | A1 | 12/2011 | Kavanagh et al. |
| 2012/0134271 | A1* | 5/2012 | Gantenbein ............. H04L 41/12 |
| | | | 370/235 |
| 2013/0035973 | A1* | 2/2013 | Desai ..................... G06Q 10/06 |
| | | | 705/7.11 |
| 2013/0275263 | A1 | 10/2013 | Carlin, Jr. et al. |
| 2013/0283370 | A1 | 10/2013 | Vipat et al. |
| 2013/0290932 | A1 | 10/2013 | Kruglick |
| 2014/0052500 | A1 | 2/2014 | Vallapuzha et al. |
| 2014/0068073 | A1 | 3/2014 | Peles et al. |
| 2014/0095263 | A1 | 4/2014 | McAlister et al. |
| 2014/0172678 | A1 | 6/2014 | Stephens et al. |
| 2015/0006260 | A1 | 1/2015 | Harris |
| 2015/0332185 | A1 | 11/2015 | Zakkam et al. |
| 2015/0350174 | A1 | 12/2015 | Reno et al. |
| 2015/0350234 | A1 | 12/2015 | Reno et al. |
| 2015/0358207 | A1 | 12/2015 | Baldock et al. |
| 2016/0012707 | A1 | 1/2016 | McKinley et al. |
| 2016/0019489 | A1 | 1/2016 | Bergmann et al. |
| 2016/0077893 | A1 | 3/2016 | Laredo et al. |
| 2016/0080422 | A1 | 3/2016 | Belgodere et al. |
| 2016/0338229 | A1 | 11/2016 | Gauthier et al. |
| 2016/0380862 | A1* | 12/2016 | Shapsa ............... G06Q 10/0637 |
| | | | 709/224 |
| 2017/0006410 | A1 | 1/2017 | Barrett et al. |
| 2017/0093700 | A1 | 3/2017 | Gilley et al. |
| 2017/0230251 | A1 | 8/2017 | Dube et al. |
| 2017/0257303 | A1 | 9/2017 | Boyapalle et al. |
| 2017/0357224 | A1 | 12/2017 | Berrien |
| 2018/0005121 | A1 | 1/2018 | Hoque et al. |
| 2018/0019910 | A1 | 1/2018 | Tsgkaris et al. |
| 2018/0020018 | A1 | 1/2018 | Walheim et al. |
| 2018/0075393 | A1 | 3/2018 | Lovell |
| 2018/0211342 | A1 | 7/2018 | Hoareau |
| 2018/0285997 | A1 | 10/2018 | Bostick et al. |
| 2018/0295037 | A1 | 10/2018 | Basile et al. |
| 2018/0300793 | A1 | 10/2018 | Chen et al. |
| 2018/0349101 | A1 | 12/2018 | Lyras et al. |
| 2019/0036869 | A1 | 1/2019 | Jana |
| 2019/0095814 | A1 | 3/2019 | Dubovsky et al. |
| 2019/0138964 | A1 | 5/2019 | Morita et al. |
| 2019/0213061 | A1 | 7/2019 | Campos-Guajardo et al. |
| 2019/0227861 | A1 | 7/2019 | Majumder et al. |
| 2019/0243968 | A1 | 8/2019 | Gordeychik et al. |
| 2019/0268233 | A1 | 8/2019 | Singh |
| 2020/0026851 | A1 | 1/2020 | Dhanka et al. |
| 2020/0143401 | A1 | 5/2020 | Phillips et al. |
| 2020/0159638 | A1 | 5/2020 | Gupta et al. |
| 2020/0233391 | A1 | 7/2020 | Ma et al. |
| 2020/0304571 | A1 | 9/2020 | Ranjan et al. |
| 2020/0327980 | A1 | 10/2020 | Einav et al. |
| 2020/0371896 | A1 | 11/2020 | Mathur et al. |
| 2021/0027401 | A1 | 1/2021 | Hovhannisyan et al. |
| 2021/0034048 | A1 | 2/2021 | Hajizadeh |
| 2021/0112145 | A1 | 4/2021 | Monga et al. |
| 2021/0133670 | A1* | 5/2021 | Cella ..................... G06N 20/10 |
| 2021/0144232 | A1 | 5/2021 | Ramalingam et al. |
| 2021/0176625 | A1 | 6/2021 | Hurst et al. |
| 2021/0216978 | A1 | 7/2021 | Diaz |
| 2021/0234885 | A1 | 7/2021 | Campbell |
| 2021/0240551 | A1 | 8/2021 | Joyce et al. |
| 2021/0248145 | A1 | 8/2021 | Parker |
| 2021/0258225 | A1 | 8/2021 | Harper |
| 2021/0390562 | A1 | 12/2021 | Reznic et al. |
| 2022/0012105 | A1 | 1/2022 | Chagam Reddy |
| 2022/0078072 | A1* | 3/2022 | Rayes ................. H04L 41/0813 |
| 2022/0180890 | A1 | 6/2022 | Ramaiah |
| 2022/0247635 | A1 | 8/2022 | Guim Bernat et al. |
| 2022/0273837 | A1 | 9/2022 | Paul et al. |
| 2022/0404803 | A1 | 12/2022 | Sayyarrodsari et al. |
| 2022/0414576 | A1 | 12/2022 | Reineke et al. |
| 2023/0048513 | A1 | 2/2023 | Gao et al. |
| 2023/0176441 | A1 | 6/2023 | Magcale |
| 2023/0222012 | A1 | 7/2023 | Wu et al. |
| 2023/0231771 | A1 | 7/2023 | Nedungadi et al. |
| 2023/0239211 | A1 | 7/2023 | Palmero et al. |
| 2023/0252902 | A1 | 8/2023 | Bianchi et al. |
| 2023/0376011 | A1 | 11/2023 | Platenius-Mohr et al. |
| 2023/0376888 | A1 | 11/2023 | Lee et al. |
| 2024/0031439 | A1 | 1/2024 | Chevalier et al. |
| 2024/0098470 | A1 | 3/2024 | Kundu et al. |

FOREIGN PATENT DOCUMENTS

| | | |
|---|---|---|
| WO | 2010045122 A2 | 4/2010 |
| WO | 2013010160 A1 | 1/2013 |
| WO | 2013165030 A1 | 11/2013 |

OTHER PUBLICATIONS

Sunitha Abburu et al., Ontology Storage Models and Tools: An Authentic Survey, J. Intell. Syst. 2016; 25(4):539-553, https://www.degruyter.com/document/doi/10.1515/jisys-2014-0167/html, published online Aug. 22, 2015.

Carlo Vezzoli et al., New Design challenges to widely implemented sustainable product-services systems, 2015, Journal of Cleaner Production, 97, pp. 1-12. (Year: 2015).

Ferdian Thung; API Recommendation System for Software Development; ACM; pp. 896-899; retrieved on Sep. 21, 2023. (Year: 2016).

Qiao Huang et al.; API Method Recommendation without Worrying about the Task-API Knowledge Gap; IEEE; pp. 293-304; retrieved on Sep. 21, 2023. (Year: 2023).

What is Platform as a Service (PaaS)? https://www.crowdbotics.com/blog/how-to-know-if-you-should-switch-to-a-platform-as-a-service-paas-solution, Nov. 17, 2020 (Year: 2020).

Hirsch, Peter Buell, Footprints in the cloud: The hidden cost of IT infrastructure. The Journal of Business Strategy, 43(1), 65-68. doi: http://dx.doi.org/10.1108/JBS-11-2021-0175 (Year: 2022).

Anonymous, Microsoft research supports exploration into energy-efficient computing: Company's environmental research efforts deepen with new 'power aware' program. (Apr. 28, 2008). PR Newswire (Year: 2008).

Anonymous, How to end NZ's e-waste shame. (Jul. 18, 2021). Sunday Star—Times (Year: 2021).

Nilsson, Fredrik. (Sep. 2009). How green is your security? Security Technology Executive, 19, 48-48,50 (Year: 2009).

Anonymous, Ericsson Gets Spare Parts Management Service Contract with Telefonica Mexico. Wireless News, NA (Year: 2007).

(56) References Cited

OTHER PUBLICATIONS

Behi et al., Consumer Engagement in Virtual Power Plants through Gamification, 2020 5th International Conference on Power and Renewable Energy (ICPRE), Shanghai, China, 2020, pp. 131-137, doi: 10.1109/ICPRE51194.2020.9233110, pp. 131-133 (Year: 2020).

* cited by examiner

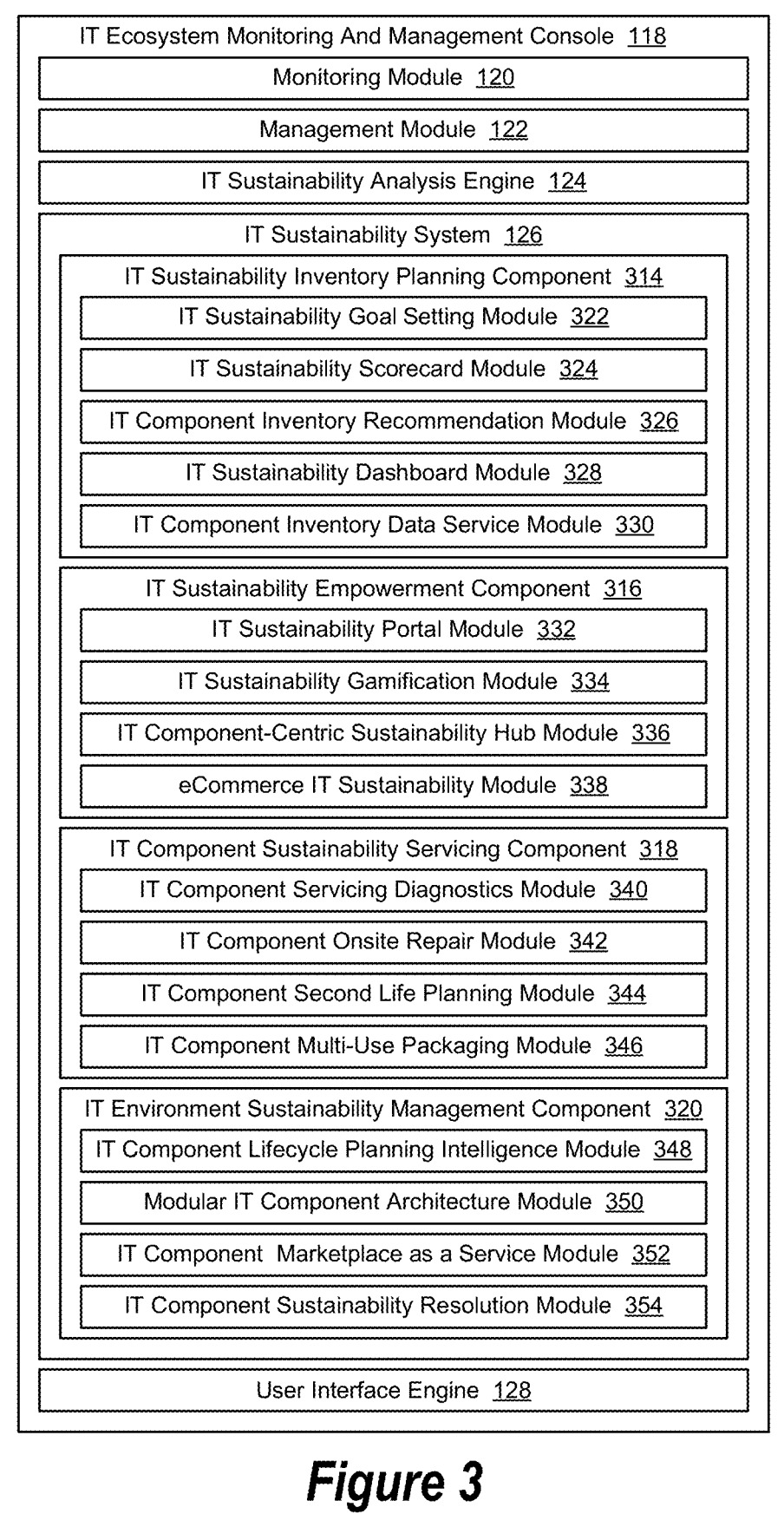

IT Ecosystem Monitoring And Management Console 118

Monitoring Module 120

Management Module 122

IT Sustainability Analysis Engine 124

IT Sustainability System 126

IT Sustainability Inventory Planning Component 314

IT Sustainability Goal Setting Module 322

IT Sustainability Scorecard Module 324

IT Component Inventory Recommendation Module 326

IT Sustainability Dashboard Module 328

IT Component Inventory Data Service Module 330

IT Sustainability Empowerment Component 316

IT Sustainability Portal Module 332

IT Sustainability Gamification Module 334

IT Component-Centric Sustainability Hub Module 336 eCommerce IT Sustainability Module 338

IT Component Sustainability Servicing Component 318

IT Component Servicing Diagnostics Module 340

IT Component Onsite Repair Module 342

IT Component Second Life Planning Module 344

IT Component Multi-Use Packaging Module 346

IT Environment Sustainability Management Component 320

IT Component Lifecycle Planning Intelligence Module 348

Modular IT Component Architecture Module 350

IT Component  Marketplace as a Service Module 352

IT Component Sustainability Resolution Module 354

User Interface Engine 128

*Figure 3*

User Interface

1402

IT Component Second Life Planning 1404

IT Component Credit Overview 1406

| IT COMPONENT 1408 | CREDIT 1410 | NEXT USE 1412 | DESTINATION 1414 |
|---|---|---|---|
| Keyboard/Trackpad | $35.88 | Refurbishment Part | Seattle Repair Center |
| Battery Module | $150.04 | Cascaded Component | Houston Second Life Center |
| Laptop Top Cover | $12.67 | Recycle | Tulsa Recycling Center |
| CPU Module | $235.76 | Cascaded Component | Houston Second Life Center |
| Display/Camera Module | $87.34 | Cascaded Component | Houston Second Life Center |

$253.45 1416

Available Credit

*Figure 14*

INFORMATION TECHNOLOGY ECOSYSTEM ENVIRONMENT FOR GENERATING SUSTAINABILITY INFORMATION FOR USE WHEN INTEGRATING SUSTAINABILITY AND INFORMATION TECHNOLOGY PLANNING

BACKGROUND OF THE INVENTION

Field of the Invention

The present invention relates to information handling systems. More specifically, embodiments of the invention relate to performing an information technology (IT) sustainability operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing an information technology (IT) ecosystem management and monitoring operation, comprising: executing a sustainability application on a hardware processor of an information handling system, the information handling system being located within an IT ecosystem; obtaining sustainability information regarding the information handling system via the sustainability application; providing an IT ecosystem monitoring and management console, the IT ecosystem monitoring and management console comprising an IT ecosystem sustainability system, the IT ecosystem sustainability system comprising a sustainability component; and, communicating between the sustainability component and the sustainability application to perform an IT inventory sustainability planning operation, the communicating providing the sustainability component with the sustainability information regarding the information handling system.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: providing a sustainability application to an information handling system, the information handling system being located within an IT ecosystem; obtaining sustainability information regarding the information handling system via the sustainability application; providing an IT ecosystem monitoring and management console, the IT ecosystem monitoring and management console comprising an IT ecosystem sustainability system, the IT ecosystem sustainability system comprising a sustainability component; and, communicating between the sustainability component and the sustainability application to perform an IT inventory sustainability planning operation, the communicating providing the sustainability component with the sustainability information regarding the information handling system.

In another embodiment the invention relates to a computer-readable storage medium embodying computer program code, the computer program code comprising computer executable instructions configured for: providing a sustainability application to an information handling system, the information handling system being located within an IT ecosystem; obtaining sustainability information regarding the information handling system via the sustainability application; providing an IT ecosystem monitoring and management console, the IT ecosystem monitoring and management console comprising an IT ecosystem sustainability system, the IT ecosystem sustainability system comprising a sustainability component; and, communicating between the sustainability component and the sustainability application to perform an IT inventory sustainability planning operation, the communicating providing the sustainability component with the sustainability information regarding the information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 is a block diagram showing components of an IT sustainability system;

FIG. 14 shows a UI implemented to provide certain IT component second life planning information;

DETAILED DESCRIPTION

Figure 1:
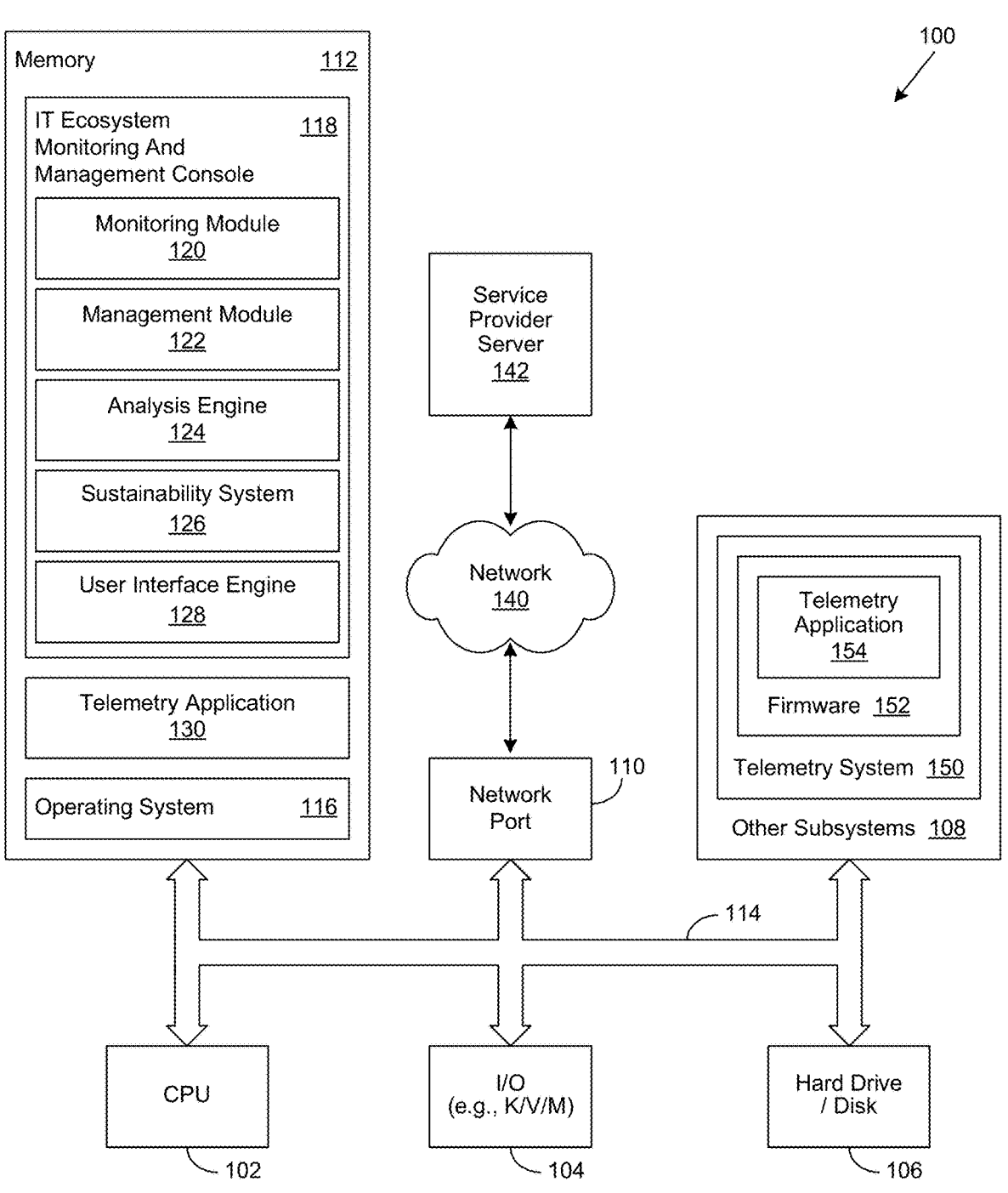
FIG. 1 shows a general illustration of components of an information handling system as implemented in the system and method of the present invention.

A system, method, and computer-readable medium are disclosed for performing an information technology (IT) sustainability operation, described in greater detail herein. Various aspects of the invention reflect an appreciation that the use of IT, whether it be at large, corporate scale, or by individual consumers, contributes significantly to the world's carbon footprint. Likewise, various aspects of the invention reflect an appreciation that sustainability is increasingly becoming a key differentiator when considering the purchase, or use, of various IT equipment and services. Certain aspects of the invention likewise reflect an appreciation that such IT sustainability considerations often include environmental awareness, government regulations, technical innovation, operational efficacy, and cost. Accordingly, certain aspects of the invention reflect an appreciation that IT sustainability considerations may eventually have both a direct, and indirect, effect on various facets of IT planning, deployment, implementation, and operations.

Various aspects of the invention likewise reflect an appreciation that while 50% of organizations currently say they have an enterprise-wide sustainability strategy, only 18% of those strategies have well-defined goals and target timelines. However, only 43% of executives say they are aware of their organization's IT footprint. Furthermore, as of 2020, 89% of organizations recycled 10% or less of their IT hardware. Moreover, more than 50 million tons of electronic waste, which is equipment nearing the end of its useful life, was generated in 2019, representing an increase of 21% over the prior five years. Concurrently, data centers accounted for 1% of the world's overall energy consumption in 2019.

Certain aspects of the invention reflect an appreciation that setting and achieving IT portfolio sustainability goals is emerging as an important issue for IT managers and users alike. Likewise, IT decision makers say recycling IT products and reducing their IT carbon footprint top the list of their most important sustainability initiatives. However, 49% of these same decision makers say a major challenge to achieving their IT sustainability goals is the lack of knowledge, tools, and standards to evaluate the overall carbon footprint of IT. Accordingly, certain aspects of the invention likewise reflect an appreciation that while many organizations are willing to pay a premium of up to 5% for sustainable IT products and services, they need the expertise, infrastructure, and systems to make an impact.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system (IHS) 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116, and in various embodiments may also comprise an information technology (IT) sustainability ecosystem monitoring and management console 118, or a telemetry application 130, or both. In one embodiment, the information handling system 100 is able to download the IT sustainability ecosystem monitoring and management console 118 from the service provider server 142. In another embodiment, the IT sustainability ecosystem monitoring and management console 118 is provided as a service from the service provider server 142.

In certain embodiments, the IT sustainability ecosystem monitoring and management console 118 may be implemented to include a monitoring module 120, a management module 122, an IT sustainability analysis engine 124, an IT sustainability system 126, and a user interface (UI) engine 128, or a combination thereof. In certain embodiments, the IT sustainability ecosystem monitoring and management console 118 may be implemented to perform an IT sustainability operation, described in greater detail herein.

In various embodiments, the other subsystems 108 may be implemented to include a baseboard management controller (BMC). Skilled practitioners of the art will be familiar with a BMC, which is a specialized service processor that monitors the physical state of an IHS 100, such as a computer, network server, or other hardware device using sensors. One known example of a BMC is the integrated Dell Remote Access Controller (iDRAC®) produced by the Dell Corporation of Round Rock, Texas. In various embodiments, the BMC may be implemented as an embedded system within an ISH 100.

In certain embodiments, the other subsystems 108 may be implemented to include a telemetry system 150. In various embodiments, the telemetry system 150 may be implemented to include certain firmware 152, familiar to those of skill in the art. In various embodiments, the firmware 152 may be implemented to support the implementation of a telemetry application 154. In various embodiments, the telemetry application 154 may be implemented as software that is embedded in firmware 152, which in certain embodiments may be run in a host operating system 116 as a daemon, or in a container as a daemon, and so forth.

In certain embodiments, the telemetry application 154 may be implemented in firmware 152 to provide a layer of security to the IHS 100. In certain embodiments, the telemetry application 154 may be implemented to be executable when it is implemented within firmware 152, even if the IHS 100 has not been booted. In certain embodiments, the telemetry application 130 implemented in memory 112, and the telemetry application 154 implemented within firmware 152, may be implemented to substantively provide the same functionality.

In certain embodiments, the IT ecosystem monitoring and management operation may be performed during operation of an information handling system 100. In various embodiments, performance of the IT ecosystem monitoring and management operation may result in the realization of improved monitoring and management of certain IT sustainability operations, as described in greater detail herein. In certain embodiments, the telemetry application 130, 154 may be implemented in combination with the IT sustainability ecosystem console 118 to perform a particular IT sustainability operation, as likewise described in greater detail herein. As an example, the telemetry application 130, 154 may be implemented on one information handling system 100, while the IT sustainability ecosystem console 118 may be implemented on another, as likewise described in greater detail herein.

Figure 2:
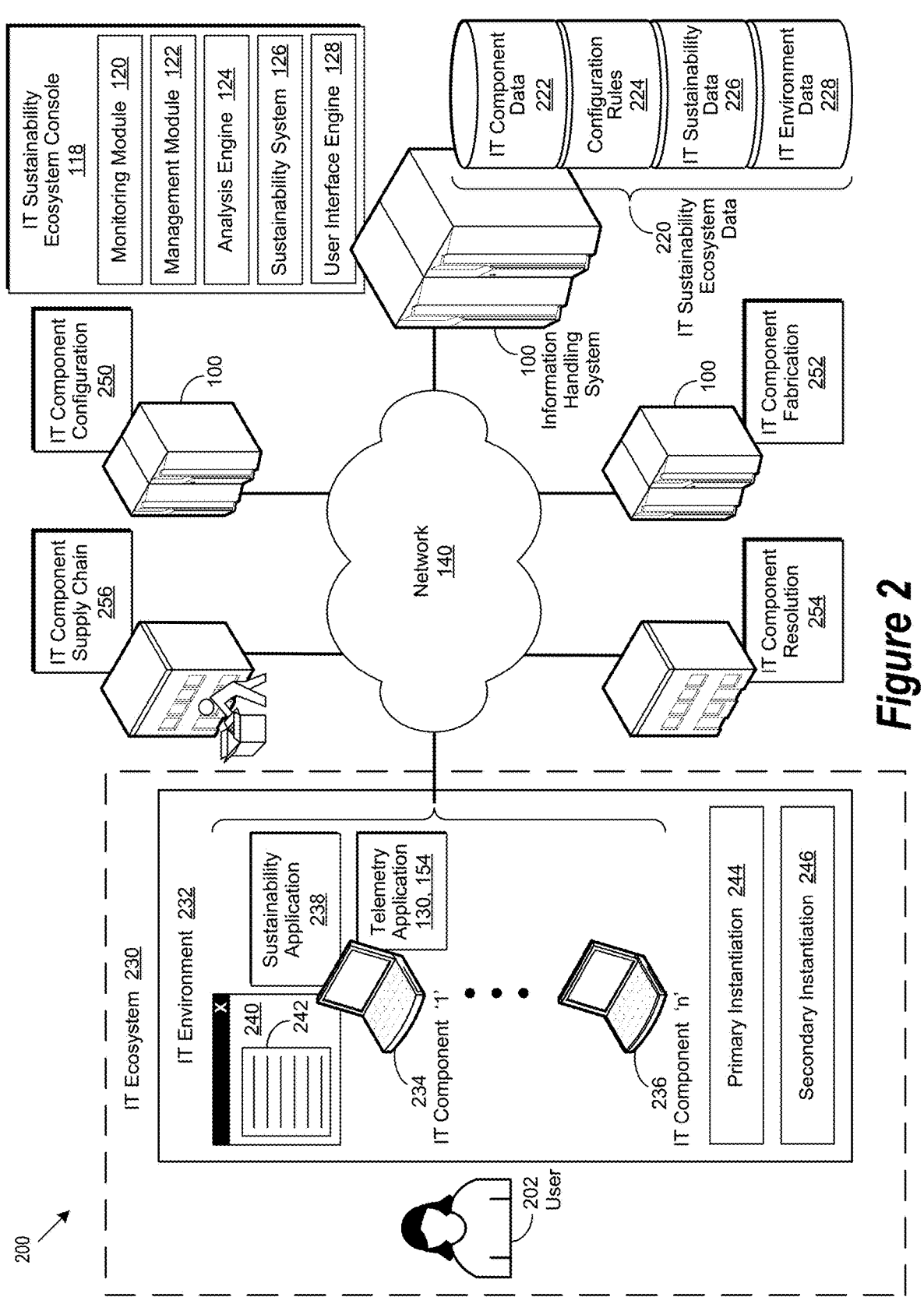
FIG. 2 is a simplified block diagram of an information technology (IT) sustainability ecosystem.

FIG. 2 is a simplified block diagram of an information technology (IT) sustainability ecosystem implemented in accordance with an embodiment of the invention. As used herein, IT sustainability, sometimes referred to as green IT, broadly refers to a combination of IT planning, manufacturing, management, use, and disposal practices that may reduce the impact of IT on the environment. To illustrate this concept, more than 272 million new laptop computers are currently manufactured every year, with approximately 160 thousand older laptops being disposed of every day in the European Union (EU) alone. Accordingly, various embodiments of the invention reflect an appreciation that the potential for reducing the impact on the environment by extending the usable life of IT devices, in combination with lowering their carbon footprint, is increasingly being recognized by corporate executives and users alike.

In various embodiments, the IT sustainability ecosystem 200 shown in FIG. 2 may include an IT ecosystem 230. As used herein, an IT ecosystem 230 broadly refers to a network of organizations that drive the creation, delivery, and support of IT products and services for a user 202. In various embodiments, the IT ecosystem 230 may include one or more IT environments 232.

An IT environment 232, as used herein, broadly refers to the infrastructure, hardware, software, and systems that a user 202 relies upon in the course of using IT. In certain embodiments, an IT environment 232 may include one or more IT components '1' 234 through 'n' 236, described in greater detail herein. In various embodiments, one or more of the IT components '1' 234 through 'n' 236 may be configured according to a modular IT component architecture.

As used herein, a modular IT component architecture broadly refers to a collection of individual IT components, or sub-components, or both, designed to be connected together in a modular configuration. In various embodiments, certain sub-components of a particular IT component '1' 234 through 'n' 236 configured according to a modular IT component architecture may be replaced without affecting the other sub-components of its associated IT component, or certain other IT components '1' 234 through 'n' 236. In various embodiments, a modular IT component architecture may be implemented such that individual IT components '1' 234 through 'n' 236, or certain sub-components thereof, may be replaced, repurposed, reassigned, repaired, reconfigured, refurbished, remanufactured, recycled, resold, or recovered, or a combination thereof, to conform to certain IT sustainability parameters, rules, guidelines, or goals, or a combination thereof.

In various embodiments one or more IT components '1' 234 through 'n' 236, or sub-components thereof, may be configured according to a modular IT component architecture to facilitate the performance of certain IT sustainability operations, described in greater detail herein, such that they may reduce the impact of IT on the environment. In various embodiments, one or more IT components '1' 234 through 'n' 236 may be configured according to a modular IT component architecture corresponding to an information handling system (IHS), described in greater detail herein. In certain of these embodiments, the IHS may be a portable IHS, such as a laptop computer, a tablet computer, a personal digital assistant (PDA), a smart phone, and so forth.

In various embodiments, individual IT components '1' 234 through 'n' 236, or sub-components thereof, of such a modular IT component architecture may be monitored and tracked during their operation. In certain embodiments, the modular IT component architecture may be implemented to facilitate the monitoring and management of certain IT components '1' 234 through 'n' 236, or sub-components thereof. In various embodiments, the monitoring and management of IT components '1' 234 through 'n' 236 may be respectively performed by a monitoring module 120 and a management module 122 of an IT sustainability ecosystem console 118, as described in greater detail herein.

In various embodiments, certain IT sustainability information associated with such individual IT components may be collected and analyzed, as described in greater detail herein, throughout the lifecycle of a particular IT component '1' 234 through 'n' 236, or sub-components thereof. In various embodiments, the results of such analysis may be one or more recommendations to replace, repurpose, reassign, repair, reconfigure, refurbish, remanufacture, resale, recycle, or recover, or a combination thereof, a particular IT component, or a sub-component thereof, as likewise described in greater detail herein. In various embodiments, certain IT components '1' 234 through 'n' 236 may be implemented with a modular IT component architecture to automate, or facilitate, their configuration, assembly, reconfiguration, and disassembly, or a combination thereof.

In certain of these embodiments, such configuration, assembly, reconfiguration, and disassembly, or a combination thereof, may facilitate performing a circular IT sustainability operation via an IT sustainability ecosystem 200. As used herein, a circular IT sustainability operation broadly refers to the procurement, deployment, implementation, operation, management, maintenance, remediation, replacement, repurposing, reassignment, repair, reconfiguration, refurbishment, remanufacture, resale, recycling, or recovery, or a combination thereof, of a particular IT component, or a sub-component thereof, throughout its lifecycle, as described in greater detail herein, such that it may reduce the impact of IT on the environment.

In various embodiments, the one or more IT components '1' 234 through 'n' 236 may individually be implemented with a telemetry application 130, 154, described in greater detail herein, an IT sustainability application 238, and an IT sustainability user interface (UI) 240, likewise described in greater detail herein, or a combination thereof. In certain embodiments, the IT sustainability UI 240 may be implemented to display one or more sustainability application UI windows 242, as described in greater detail herein.

In various embodiments, the IT environment 232 for a particular user 202 may include a primary 244 and a secondary 246 instantiation. In certain of these embodiments, the primary 244 and secondary 246 IT environment 232 instantiations respectively correlates to the primary and secondary location of the IT environment 232 a user 202 may use a particular IT component. As an example, the primary 244 instantiation of the IT environment 232 for a first user 202 may be the office of their employer, when they work on-site, while the secondary 246 instantiation may be their residence when they work from home. As another example, the primary 244 instantiation of the IT environment 232 for a second user 202 may be their residence, as they work from home four days a week, while the secondary 246 instantiation may be the office of their employer, where they work one day a week.

As yet another example, the primary instantiation 244 of an IT environment 232 for a user 202 to use a desktop computer for business purposes may be their office. Conversely, the secondary instantiation 246 of an IT environment 232 for the same user 202 may be their residence when using a laptop or tablet computer for business purposes. Skilled practitioners of the art will recognize that many such examples are possible. Accordingly, the foregoing is not intended to limit the spirit, scope, or intent of the invention.

In various embodiments, the IT environment 232 may be implemented in a data center, an office workspace, a public venue, such as a coffee shop or shared workspace, the residence of a user 202, and so forth. As used herein, a data center broadly refers to a building, a dedicated space within a building, or a group of buildings, used to house a collection of interrelated IT components '1' 234 through 'n' 236 implemented to work in combination with one another for a particular purpose. As likewise used herein, an IT component broadly refers to anything, tangible or intangible, that can be owned, controlled, or enabled to produce value as a result of its use within an IT environment 232. In certain embodiments, an IT component may include a product, such as an information handling system (IHS), described in greater detail herein, or a service, familiar to those of skill in the art, or a combination of the two.

As used herein, a tangible IT component broadly refers to an IT component '1' 234 through 'n' 236 having a physical substance, such as a computing or network device. Examples of computing devices may include personal computers (PCs), laptop PCs, tablet computers, smart phones, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible IT component '1' 234 through 'n' 236 may include certain data center personnel, such as a data center system administrator, operator, or technician, and so forth. Further examples of a tangible IT component '1' 234 through 'n' 236 may include certain maintenance, repair, and operations (MRO) items, such as replacement and upgrade parts for a particular data center asset. In certain embodiments, such MRO items may be in the form of consumables, such as air filters, fuses, fasteners, and so forth.

As likewise used herein, an intangible IT component '1' 234 through 'n' 236 broadly refers to an IT component that lacks physical substance. Examples of intangible IT components '1' 234 through 'n' 236 may include software applications, software services, firmware code, and other non-physical, computer-based assets. Other examples of intangible IT components '1' 234 through 'n' 236 may include digital assets, such as structured and unstructured data of all kinds, still images, video images, audio recordings of speech and other sounds, and so forth. Further examples of intangible IT components '1' 234 through 'n' 236 may include intellectual property, such as patents, trademarks, copyrights, trade names, franchises, goodwill, and knowledge resources, such as data center asset documentation. Yet other examples of intangible IT components '1' 234 through 'n' 236 may include certain tasks, functions, operations, procedures, or processes performed by a user 202. Those of skill in the art will recognize that many such examples of tangible and intangible IT components '1' 234 through 'n' 236 are possible. Accordingly, the foregoing is not intended to limit the spirit, scope or intent of the invention.

In certain embodiments, the value produced by one or more IT components '1' 234 through 'n' 236 may be tangible or intangible. As used herein, tangible value broadly refers to value that can be measured. Examples of tangible value may include certain IT sustainability objectives that have been met, return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, market perception, and environmental responsibility. Skilled practitioner of the art will recognize that many such examples of tangible and intangible value are possible. Accordingly, the foregoing is not intended to limit the spirit, scope or intent of the invention.

In certain embodiments, the IT sustainability ecosystem 200 may include an IT sustainability ecosystem console 118. In certain embodiments, the IT sustainability ecosystem console 118 may be implemented to perform an IT sustainability operation. As used herein, an IT sustainability operation broadly refers to any task, function, operation, procedure, or process performed, directly or indirectly, within an IT sustainability ecosystem 200 to potentially reduce the impact of IT on the environment.

In certain embodiments, an IT sustainability operation may include an IT component monitoring task. As used herein, an IT component monitoring task broadly refers to any function, operation, procedure, or process performed, directly or indirectly, within an IT environment 232 to monitor the operational status of a particular IT component. In various embodiments, a particular IT component may be implemented to generate an alert if its operational status, such as its consumption of energy, exceeds certain IT sustainability parameters. In these embodiments, the definition of such IT sustainability parameters, and the method by which they may be selected, is a matter of design choice.

As an example, an internal cooling fan of a server may begin to fail, which in turn may cause the operational temperature of the server to exceed its rated level. In this example, excess energy may be required to cool the server in its current operational state. To continue the example, the server may be implemented to generate an alert, which provides notification of the occurrence of an IT component sustainability issue. As used herein, an IT sustainability issue broadly refers to an operational situation associated with a particular IT component of an IT environment 232, which if not corrected, may result in negative IT sustainability consequences. In certain embodiments, an IT component sustainability issue may be related to the occurrence, or predicted occurrence, of an anomaly within the IT environment 232. In certain embodiments, the anomaly may be related to unusual or unexpected IT sustainability behavior of one or more IT components.

In certain embodiments, an IT sustainability operation may include an IT component management task. As used herein, an IT component management task broadly refers to any function, operation, procedure, or process performed, directly or indirectly, within an IT environment 232 to manage a particular IT component. In certain embodiments, an IT component management task may include an IT component deployment operation, an IT component sustainability resolution operation, an IT component sustainability resolution documentation operation, an IT component connectivity management operation, or a combination thereof.

As used herein, an IT component deployment operation broadly refers to any function, operation, task, procedure, or process performed, directly or indirectly, within an IT sustainability ecosystem 200 deploy a new, replacement, repurposed, reassigned, repaired, reconfigured, refurbished, or remanufactured IT component, or a sub-component thereof, for use by one or more users 202. In various embodiments, an IT component deployment operation may likewise include the installation of a software file, such as a configuration file, a new software application, a version of an operating system, and so forth, on an associated IT component '1' 234 through 'n' 236. As likewise used herein, an IT component sustainability resolution operation broadly refers to any function, operation, task, procedure, or process performed, directly or indirectly, within an IT sustainability ecosystem 200 to correct an operational situation associated with a particular IT component '1' 234 through 'n' 236 deployed within an IT sustainability ecosystem 200, which if not corrected, may result in negative consequences.

In various embodiments, such negative consequences may include an adverse affect on the environment. As an example, an IT component sustainability resolution operation may be performed to schedule a process that normally runs on a server during business hours to instead run at 2:00 AM in the morning. In this example, the rescheduling of the process reduces the amount of power used during peak usage periods of the day, which in turn reduces the demand load of the generator(s) supplying power used by the server.

An IT component sustainability resolution documentation operation, as likewise used herein, broadly refers to any function, operation, task, procedure, or process performed, directly or indirectly, within an IT sustainability ecosystem 200 to retrieve, generate, revise, update, or store IT component sustainability resolution documentation that may be used in the performance of an IT component sustainability resolution operation. Likewise, as used herein, an IT component connectivity management operation (also referred to as an IT environment connectivity management operation) broadly refers to any function, operation, task, procedure, or process performed, directly or indirectly, to manage connectivity between a particular IT component '1' 234 through 'n' 236 and a particular IT sustainability ecosystem console 118. In various embodiments, one or more IT component connectivity management operations may be performed to ensure that data exchanged between a particular IT component '1' 234 through 'n' 236 and a particular IT sustainability ecosystem console 118 during a communication session is secured. In certain of these embodiments, various cryptographic approaches familiar to skilled practitioners of the art may be used to secure a particular communication session.

In certain embodiments, the IT sustainability ecosystem console 118 may be implemented to receive an alert corresponding to a particular IT component sustainability issue. In various embodiments, the IT sustainability ecosystem console 118 may be implemented to receive certain data associated with the operation of a particular IT component. In certain embodiments, such operational data may be received through the use of telemetry approaches familiar to those of skill in the art. In various embodiments, such operational data corresponding to a particular IT component '1' 234 through 'n' 236 may be provided by its associated telemetry application 130, 154, described in greater detail herein. In various embodiments, the IT sustainability ecosystem console 118 may be implemented to process certain operational data received from a particular IT component '1' 234 through 'n' 236 via its associated telemetry application 130, 154 to determine whether an IT component sustainability issue has occurred, is occurring, or is anticipated to occur.

In certain embodiments, the IT sustainability ecosystem console 118 may be implemented to include a monitoring module 120, a management monitor 122, an IT sustainability analysis engine 124, an IT sustainability system 126, and a user interface (UI) engine 128, or a combination thereof. In certain embodiments, the monitoring module 120 may be implemented to monitor the procurement, deployment, implementation, operation, management, maintenance, remediation, replacement, repurposing, reassignment, repair, reconfiguration, refurbishment, remanufacture, resale, recycling, or recovery, or a combination thereof, of a particular IT component 1' 234 through 'n' 236, or a sub-component thereof, at any point in its lifecycle.

In various embodiments, the monitoring module 120 may be implemented to generate certain monitoring data. In various embodiments, such monitoring data may be associated with monitoring the procurement, deployment, implementation, operation, management, maintenance, remediation, replacement, repurposing, reassignment, repair, reconfiguration, refurbishment, remanufacture, resale, recycling, or recovery, or a combination thereof, of a particular IT component 1' 234 through 'n' 236, or a sub-component thereof, at any point in its lifecycle. In various embodiments, the monitoring module 120 may be implemented to store such monitoring data in a repository of IT sustainability ecosystem 220 data described in greater detail herein.

In certain embodiments, the management module 122 may be implemented to manage the procurement, deployment, implementation, operation, monitoring, maintenance, remediation, replacement, repurposing, reassignment, repair, reconfiguration, refurbishment, remanufacture, resale, recycling, or recovery, or a combination thereof, of a particular IT component '1' 234 through 'n' 236, or a sub-component thereof, at any point in its lifecycle. In various embodiments, the management module 122 may be implemented to generate certain management data. In various embodiments, such management data may be associated with managing the procurement, deployment, implementation, operation, management, maintenance, remediation, replacement, repurposing, reassignment, repair, reconfiguration, refurbishment, remanufacture, resale, recycling, or recovery, or a combination thereof, of a particular IT component 1' 234 through 'n' 236, or a sub-component thereof, at any point in its lifecycle. In various embodiments, the management module 122 may be implemented to store such management data in a repository of IT sustainability ecosystem 220 data, described in greater detail herein.

In various embodiments, the IT sustainability analysis engine 124 may be implemented to perform an IT sustainability analysis operation. As used herein, an IT sustainability analysis operation broadly refers to any task, function, operation, procedure, or process performed, directly or indirectly, to analyze certain IT sustainability information to determine one or more IT sustainability operations, described in greater detail herein, such that their performance may reduce the impact of IT on the environment. In various embodiments, the IT sustainability analysis engine 124 may be implemented to use certain IT sustainability data contained in a repository of IT sustainability ecosystem data to perform a particular IT sustainability analysis operation.

As an example, a data center may have a group of twenty four servers assigned to process a variety of workloads. In this example, all of the servers are the same model, yet they have various configurations. Some have more processors than others, while some have more memory, and each has varying network connectivity abilities. Furthermore, each is at least four years old, and some are approaching the end of their usefulness for their intended purpose.

To continue the example, the IT sustainability analysis engine 124 may use certain IT sustainability data associated with the group of twenty four servers stored in the repository of IT sustainability ecosystem data 220 to perform one or more IT sustainability analysis operations. To continue the example further, performance of the one or more IT sustainability analysis operations may result in a recommendation to reconfigure twelve of the newest servers with additional processors, memory, and network capability, while replacing the twelve oldest servers with a newer model of server that provides fifty percent more processing power, yet consumes forty percent less electrical power. Accordingly, in this example, following the recommendations will result in optimizing the use of the newest existing servers, while reducing power consumption overall by purchasing the new servers.

In various embodiments, the UI engine 128 may be implemented to perform an IT sustainability UI 240 generation operation. As used herein, an IT sustainability UI 240 generation operation broadly refers to any task, function, operation, procedure, or process performed, directly or indirectly, to generate a UI implemented to display certain IT sustainability information, as described in greater detail herein. In various embodiments, such an IT sustainability UI 240 may be implemented to receive user 202 input related to certain IT sustainability information.

As an example, as described in greater detail herein, certain IT sustainability information associated with a particular user 202 may be displayed within an IT sustainability UI 240. In this example, the IT sustainability information associated with the user 202 may be displayed in comparison to similar IT sustainability information associated with other users 202. To continue the example, the user 202 may decide to use the IT sustainability information displayed within the IT sustainability UI 240 to change their IT usage habits to more closely match certain IT sustainability information associated with the other users 202.

In various embodiments, the monitoring module 120, the management module 122, the IT sustainability analysis engine 124, the IT sustainability system 126, and the UI engine 128 may be implemented, individually or in combination with one another, to perform an IT sustainability operation, as likewise described in greater detail herein. In certain embodiments, the IT sustainability ecosystem 200 may include a repository of IT sustainability ecosystem data 220. In certain embodiments, the repository of IT sustainability ecosystem data 220 may be local to the information handling system 100 executing the IT sustainability ecosystem console 118 or may be located remotely. In various embodiments, the repository of IT sustainability ecosystem data 220 may include certain IT component 222 data, IT component configuration rules 224 data, IT sustainability 226 data, and IT environment 228 data.

As used herein, IT component 222 data broadly refers to information associated with a particular IT component, such as IT components '1' 234 through 'n' 236, or an associated workload, that can be read, measured, and structured into a usable format. For example, IT component 222 data associated with a particular server may include the number and type of processors it can support, their respective speed and architecture, minimum and maximum amounts of memory supported, various storage configurations, the number, type, and speed of input/output channels and ports, its overall energy usage, and so forth. In various embodiments, the IT component 222 data may likewise include certain performance and configuration information associated with a particular workload, as described in greater detail herein. In various embodiments, the IT component 222 data may include certain public or proprietary IT sustainability information related to IT component configurations associated with a particular workload.

In various embodiments, the IT component 222 data may include information associated with IT component types, quantities, locations, use types, optimization types, workloads, performance, support information, certain IT sustainability information, and cost factors, or a combination thereof, as described in greater detail herein. In certain embodiments, the IT component 222 data may include information associated with IT component utilization patterns. In certain embodiments, the IT component 222 data may include information associated with the allocation of certain IT component 222 resources to a particular workload.

In various embodiments, the IT component configuration rules 234 data may include one or more IT component configuration rules and certain associated information. As used herein, an IT component configuration rule broadly refers to a rule used to configure a particular IT component '1' 234 through 'n' 236. In certain embodiments, one or more IT component configuration rules may be used to verify that a particular IT component configuration is the most optimal for an associated location, or workload, or certain IT sustainability objectives, or to interact with other IT components, or a combination thereof. In certain embodiments, the IT component configuration rule may be used in the performance of an IT component configuration verification operation, an IT component resolution operation, or a combination of the two. In certain embodiments, the IT component configuration verification operation, or the IT component resolution operation, or both, may be performed by an IT component configuration system 250. In certain embodiments, the IT component configuration system 250 may be used in combination with the IT sustainability ecosystem console 118 to perform an IT component configuration operation, or an IT component resolution operation, or a combination of the two.

As likewise used herein, IT sustainability 226 data broadly refers to any data associated with the performance of an IT sustainability operation, described in greater detail herein. In various embodiments, the IT sustainability 226 data may include data that may be involved, directly or indirectly, in the procurement, deployment, implementation, configuration, operation, monitoring, management, maintenance, remediation, replacement, repurposing, reassignment, repair, reconfiguration, refurbishment, remanufacture, resale, recycling, or recovery, or a combination thereof, of a particular IT component '1' 234 through 'n' 236, or a subcomponent thereof. In certain embodiments, the IT sustainability 226 data may include information related to certain IT sustainability issues, the frequency of their occurrence, their respective causes, the respective location of each IT components '1' 234 through 'n' 236 associated with such IT sustainability issues, and so forth.

In various embodiments, the IT sustainability 226 data may include information associated with IT component replacement parts, or upgrades, or certain third party services that may need to be procured in order to perform a particular IT sustainability resolution operation, described in greater detail herein. Likewise, in certain embodiments, related IT sustainability 226 data may include the amount of elapsed time before the replacement parts, or IT component upgrades, or third party services were received and implemented. In certain embodiments, the IT sustainability 226 data may include information associated with personnel who may have performed a particular IT sustainability resolution operation. Likewise, in certain embodiments, related IT sustainability 226 data may include the amount of time the personnel actually spent performing the IT sustainability resolution operation, issues encountered in performing the operation, and the eventual outcome of the operation that was performed.

In certain embodiments, the IT sustainability 226 data may include IT component sustainability resolution documentation associated with performing an IT sustainability resolution operation associated with a particular IT component '1' 234 through 'n' 236. In various embodiments, such IT component sustainability resolution documentation may include information associated with certain attributes, features, characteristics, functional capabilities, operational parameters, IT component sustainability parameters, and so forth, of a particular IT component '1' 234 through 'n' 236. In certain embodiments, such IT component sustainability resolution documentation may likewise include information, such as step-by-step procedures and associated instructions, video tutorials, diagnostic routines and tests, checklists, and so forth, associated with resolving IT sustainability issues associated with a particular IT component '1' 234 through 'n' 236.

In certain embodiments, the IT sustainability 226 data may include information associated with any related IT component sustainability resolution dependencies, such as other IT component sustainability resolution operations that may need to be performed beforehand. In certain embodiments, the IT sustainability 226 data may include certain time restrictions when an IT component sustainability resolution, such as replacing a particular server in a particular IT environment 232, may be performed. In various embodiments, the IT sustainability 226 data may likewise include certain autonomous IT sustainability rules, described in greater detail herein. In various embodiments, certain of these autonomous IT sustainability rules may be used in the performance of an autonomous IT component sustainability resolution operation, described in greater detail herein. Those of skill in the art will recognize that many such examples of IT sustainability 226 data 228 are possible. Accordingly, the foregoing is not intended to limit the spirit, scope, or intent of the invention.

As used herein, IT environment 228 data broadly refers to any data associated with one or more infrastructure components of an IT environment. In certain embodiments, such infrastructure components of an IT environment 232 may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, IT environment 232 infrastructure components may likewise include the provision of certain services, such as network connectivity, conditioned airflow, electrical power, and water, or a combination thereof.

In certain embodiments, various IT components '1' 234 through 'n' 236 within an IT environment 232 may have certain interdependencies. As an example, an IT environment 232 may have multiple servers interconnected by a storage area network (SAN) providing block-level access to various disk arrays and tape libraries. In this example, the servers, various physical and operational elements of the SAN, as well the disk arrays and tape libraries, are interdependent upon one another.

In certain embodiments, each IT component '1' 234 through 'n' 236 in an IT environment 232 may have an associated maintenance schedule and service contract. For example, an IT environment 232 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual IT components '1' 234 through 'n' 236 in an IT environment 232 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the IT sustainability ecosystem 200 may include an IT component configuration system 250, an IT component fabrication system 252, an IT component sustainability resolution system 254, and IT component supply chain system 256, or a combination thereof. In various embodiments, the IT component configuration system 250 may be implemented to perform IT component configuration operations. In certain embodiments, the IT component configuration operation may be performed to configure a particular IT components '1' 234 through 'n' 236 to meet certain IT sustainability parameters, or objectives, or both. In certain embodiments, the IT sustainability ecosystem console 118 may be implemented to interact with the IT component configuration system 250 to perform a particular IT component configuration operation. In various embodiments, the IT component configuration system 250 may be implemented to generate, manage, and provide, or some combination thereof, IT component configuration rules 224. In various embodiments, the IT component configuration rules 224 may be used to configure a particular data IT components '1' 234 through 'n' 236 to meet certain IT sustainability parameters, or objectives, or both.

In certain embodiments, a user 202 may use a particular IT component '1' 234 through 'n' 236 to interact with the IT sustainability ecosystem console 118. In certain embodiments, the IT component '1' 234 through 'n' 236 may be configured to present an IT sustainability UI 240. In various embodiments, the IT sustainability UI window 240 may be implemented to present a graphical representation 242 of certain IT component monitoring and management information, which is automatically generated in response to interaction with the IT sustainability ecosystem console 118. In various embodiments, the UI engine 128 may be implemented to generate the UI window 240, or the graphical representation 242, or both. In these embodiments, the method by which the UI window 240, or the graphical representation 242, or both, is generated by the UI engine 128, and presented to the user 202, is a matter of design choice.

In certain embodiments, an IT sustainability application 238 may be implemented on a particular IT component '1' 234 through 'n' 236. In various embodiments, the IT sustainability application 238 may be implemented to facilitate a user 202, such as a data center administrator, operator, or technician, to perform a particular IT sustainability task. In various embodiments, such facilitation may include using the IT sustainability application 238 to receive a notification of an IT component resolution task, described in greater detail herein, being assigned to the user 202. In certain embodiments, the IT sustainability ecosystem console 118 may be implemented to generate the notification of the IT component sustainability resolution task, and assign it to the user. In certain embodiments, the IT sustainability ecosystem console 118 may be implemented to generate an IT component sustainability resolution operation, and once generated, provide it to the IT sustainability application 238 associated with the assigned user 202 for execution.

In certain embodiments, such facilitation may include using the IT sustainability application 238 to receive the IT component sustainability resolution operation from the IT sustainability ecosystem console 118. In various embodiments, such facilitation may include using the IT sustainability application 238 to confirm that the user 202 is at the correct physical location of a particular IT component '1' 234 through 'n' 236 having a corresponding IT sustainability issue. In certain of these embodiments, the IT sustainability application 238 may be implemented to include certain Global Positioning System (GPS) capabilities, familiar to those of skill in the art, which may be used to determine the physical location of the user 202 in relation to the physical location of a particular IT component '1' 234 through 'n' 236.

In various embodiments, such facilitation may include using the IT sustainability application 238 to ensure the user 202 is aware of, or is provided the location of, or receives, or a combination thereof, certain IT component sustainability resolution resources, described in greater detail herein, that may be needed to perform a particular IT component sustainability resolution operation. In various embodiments, such facilitation may include using the IT sustainability application 238 to view certain IT component sustainability resolution documentation, or augmented instructions, related to performing a particular IT component sustainability resolution operation. In various embodiments, such facilitation may include using the IT sustainability application 238 to certify that a particular IT component sustainability resolution operation has been performed successfully.

In certain embodiments the IT sustainability UI 240 may be implemented as a UI window 242 of the IT sustainability application 238. In various embodiments, the IT sustainability application 238 may be implemented to include, in part or in whole, certain functionalities associated with the IT sustainability ecosystem console 118. In certain embodiments, the IT sustainability UI 240, or the UI window 242, or both, may be generated by the UI engine 128. In certain embodiments, the IT sustainability application 238 may be implemented to interact in combination with the IT sustainability ecosystem console 118, and other components of the IT sustainability ecosystem 200, to perform an IT sustainability operation.

In various embodiments, the IT sustainability UI 240 may be presented via a website (not shown). In certain embodiments, the website may be provided by one or more of the IT sustainability ecosystem console 118, the IT component configuration system 250, the IT component fabrication system 252, the IT component sustainability resolution system 254, or the IT component supply chain system 256. For the purposes of this disclosure a web site may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input 208 to a web server.

In certain embodiments, a particular IT component '1' 234 through 'n' 236 may be used to exchange information between the user 202 and the IT sustainability ecosystem console 118, the IT sustainability application 238, the IT component configuration system 250, the IT component fabrication system 252, the IT component sustainability resolution system 254, and the supply chain system 256, or a combination thereof, through the use of a network 140. In various embodiments, the IT component configuration system 250 may be implemented to use certain IT component 222 data, certain IT component configuration rules 224, certain IT sustainability 226 data, and certain IT environment 228 data to generate or manage, or a combination thereof, a configuration for a particular IT component '1' 234 through 'n' 236.

In various embodiments, the IT component configuration system 250 may be implemented to provide certain IT component configuration information to an IT component fabrication system 252. In various embodiments, the IT component fabrication system 252 may be implemented to provide certain IT component fabrication information to an IT component fabrication environment (not shown). In certain embodiments, the IT component fabrication information may be used by the IT component fabrication environment to fabricate a particular IT component '1' 234 through 'n' 236, such as a server, to match a particular IT component configuration.

In various embodiments, the IT component sustainability resolution system 254 may be implemented, directly or indirectly, to replace, repurpose, reassign, repair, reconfigure, refurbish, remanufacture, recycle, resell, or recover, or a combination thereof, a particular IT component, or a sub-component thereof, as described in greater detail herein. In certain embodiments, the IT supply chain system 256 may be implemented to manage the provision, fulfillment, or deployment of a particular IT component '1' 234 through 'n' 236 produced in the product fabrication environment.

In certain embodiments, the IT sustainability ecosystem console 118 may be implemented to interact with the IT component configuration system 250, the IT component fabrication system 252, the IT component sustainability resolution system 254, and the IT component supply chain system 256, or a combination thereof, each of which in turn may be executing on a separate information handling system 100. In certain embodiments, the IT sustainability ecosystem console 118 may be implemented to interact with the IT component configuration system 250, the IT component fabrication system 252, the IT component resolution system 254, and the supply chain system 256, or a combination thereof, to perform an IT sustainability operation, as described in greater detail herein.

FIG. 3 is a block diagram showing components of an IT sustainability system implemented in accordance with an embodiment of the invention. As described in greater detail herein, an IT ecosystem monitoring and management console 118 may be implemented in certain embodiments to include a monitoring module 120, a management module 122, an information technology (IT) sustainability analysis engine 124, an IT sustainability system 126, and a user interface (UI) engine 128, or a combination thereof. In various embodiments, the IT sustainability system 126 may be implemented to include an IT sustainability inventory planning 314 component, an IT sustainability empowerment 316 component, an IT component sustainability servicing 318 component, and an IT environment sustainability management 320 component, or a combination thereof.

In certain embodiments, the IT sustainability system 126 may be implemented to perform an IT sustainability operation, described in greater detail herein. In various embodiments, the IT sustainability system 126 may be implemented to use certain data stored in a repository of IT sustainability ecosystem data, likewise described in greater detail herein, to perform a particular IT sustainability operation. In various embodiments, an IT sustainability operation may be implemented to include an IT sustainability inventory planning operation, or an IT sustainability empowerment operation, or an IT component sustainability servicing operation, or an IT environment sustainability management operation, or a combination thereof, as described in greater detail herein.

In various embodiments, the IT inventory planning 314 component, or the IT sustainability empowerment 316 component, or the IT component sustainability servicing 318 component, or the IT environment sustainability management 320 component, or a combination thereof, may be integrated into an IT component configuration system, an IT component fabrication system, an IT component sustainability resolution system, or an IT component supply chain system, or a combination thereof. In various embodiments, the IT sustainability inventory planning operation, or the IT sustainability empowerment operation, or the IT component sustainability servicing operation, or the IT environment sustainability management operation, or a combination thereof, may be offered in the form of a cloud-based service.

In various embodiments, the IT sustainability inventory planning 314 component may be implemented to perform an IT sustainability inventory planning operation. As used herein, an IT sustainability inventory planning operation broadly refers to any task, function, operation, procedure, or process, which may be performed, directly or indirectly, to plan an inventory of sustainability oriented IT components such that their performance may assist in reducing the impact of IT on the environment. In various embodiments, the IT sustainable inventory planning operation may be performed to plan the procurement, deployment, implementation, operation, management, maintenance, remediation, replacement, repurposing, reassignment, repair, reconfiguration, refurbishment, remanufacture, resale, recycling, or recovery, or a combination thereof, of an inventory of IT components, or sub-components thereof, throughout their lifecycle.

In various embodiments, the IT inventory planning 314 component may be implemented to include an IT sustainability goal setting 322 module, an IT sustainability scorecard 324 module, an IT component inventory recommendation 326 module, an IT sustainability dashboard 328 module, and an IT component inventory data service module 330, or a combination thereof. In various embodiments, an IT sustainability inventory planning operation may be implemented to include an IT sustainability goal setting operation, or a sustainability scorecard operation, or an IT component inventory recommendation operation, or an IT sustainability dashboard operation, or an IT component inventory data service operation, or a combination thereof, as described in greater detail herein.

In certain embodiments, the IT sustainability goal setting 322 module, the IT sustainability scorecard 324 module, the IT component inventory recommendation 326 module, the IT sustainability dashboard 328 module, and the IT component inventory data service module 330, or a combination thereof, may be integrated into an IT component configuration system, an IT component fabrication system, an IT component sustainability resolution system, or an IT component supply chain system, or a combination thereof. In certain embodiments, performance of the IT sustainability goal setting operation, or the IT sustainability scorecard operation, or the IT component inventory recommendation operation, or the IT sustainability dashboard operation, or the IT component inventory data service operation, or a combination thereof, may be offered in the form of a cloud-based service.

In various embodiments, the IT sustainability goal setting 322 module may be implemented to perform an IT sustainability goal setting operation. As used herein, an IT sustainability goal setting operation broadly refers to any task, function, operation, procedure, or process performed, directly or indirectly, to facilitate a user in setting one or more IT sustainability goals, described in greater detail herein, whose achievement may assist in reducing the impact of IT on the environment. In various embodiments, the IT sustainability goal setting 322 module may be implemented to set one or more IT sustainability goals by interacting with a user interface (UI) as described in greater detail herein.

In various embodiments, the IT sustainability goal setting 322 module may be implemented to allow IT sustainability goals, and associated metrics, to be documented in a structured form usable by IT sustainability and other management systems. In various embodiments, the provision of such IT sustainability goals, and associated metrics, may provide an organization IT sustainability-focused data, which in turn may reveal insights that can serve as the basis for making associated IT sustainability decisions. In certain of these embodiments, the IT sustainability goal setting 322 module may be implemented to use an Application Program Interface (API) to provide such IT sustainability goals and associated metrics.

In various embodiments, the IT sustainability scorecard 324 module may be implemented to perform an IT sustainability scorecard operation. As used herein, an IT sustainability scorecard operation broadly refers to any task, function, operation, procedure, or process performed, directly or indirectly, whose performance may assist in reducing the impact of IT on the environment by providing a user certain IT sustainability information associated with their use of IT in the form of an IT sustainability scorecard. As likewise used herein, an IT sustainability scorecard broadly refers to a statistical record used to measure a user's achievement or progress toward a particular IT sustainability goal. In various embodiments, the IT sustainability scorecard information may be implemented to include sustainability information associated with the procurement, deployment, implementation, operation, management, maintenance, remediation, replacement, repurposing, reassignment, repair, reconfiguration, refurbishment, remanufacture, resale, recycling, or recovery, or a combination thereof, of a particular IT component, or sub-components thereof, throughout their lifecycle.

In various embodiments, certain IT sustainability scorecard information provided to a user may likewise include similar IT sustainability information associated with other users. In various embodiments, the IT sustainability scorecard information may be provided to a user within a UI, as described in greater detail herein. In certain embodiments, a user may decide to use the IT sustainability information provided to them to adapt their IT usage habits to more closely match certain IT sustainability information associated with the other users. In these embodiments, the method by which certain IT sustainability scorecard information is selected to provide to a user, and the method by which it is provided, is a matter of design choice.

In various embodiments, the IT sustainability scorecard 324 module may be implemented to assist a user in assessing and understanding their current IT sustainability status by providing statistical detail. In various embodiments, the IT sustainability scorecard 324 module may be implemented to establish a connection for a particular user between certain organization's IT sustainability goals and the user's IT sustainability actions. In various embodiments, the IT sustainability scorecard 324 module may be implemented to bring together certain IT sustainability-focused data to reveal insights that may impact IT sustainability decisions.

In various embodiments, the IT sustainability scorecard 324 module may be implemented to assist an organization in tracking IT sustainability metrics and their progress towards achieving certain IT sustainability goals. In various embodiments, the IT sustainability scorecard 324 module may be implemented to measure one of more aspects of IT sustainability across one or more user's use of one or more IT components. In certain of these embodiments, the IT sustainability scorecard 324 module may be implemented to provide IT sustainability metrics for a particular type, or class, of IT components.

In various embodiments, the IT component inventory recommendation 326 module may be implemented to perform an IT inventory recommendation operation. As used herein, an IT component inventory recommendation operation broadly refers to any task, function, operation, procedure, or process performed, directly or indirectly, to generate a recommendation to perform a particular IT sustainability operation, whose performance may assist in reducing the impact of IT on the environment. In various embodiments, the IT component inventory recommendation 326 module may be implemented to provide a recommendation to a user to procure, deploy, implement, operate, manage, maintain, remediate, replace, repurpose, reassign, repair, reconfigure, refurbish, remanufacture, resell, recycle, or recover, or a combination thereof, one or more individual IT components, or sub-components thereof, associated with an inventory of IT components, throughout their respective lifecycles.

In various embodiments, the IT inventory recommendation 326 module may be implemented to assist an organization in achieving certain IT sustainability goals by recommending certain IT components be acquired for their inventory of IT components. In various embodiments, the IT inventory recommendation 326 module may be implemented to measure one of more aspects of IT sustainability across an inventory of IT components. In various embodiments, the IT inventory recommendation 326 module may be implemented to recommend certain IT sustainability metrics for an inventory of a particular type, or class, of IT components.

In various embodiments, the IT inventory recommendation 326 module may be implemented to establish a connection between an inventory of certain IT components and an organization's IT sustainability goals. In various embodiments, the IT inventory recommendation 326 module may be implemented to bring together certain IT sustainability-focused data to reveal insights that may impact IT sustainability decisions.

In various embodiments, the IT inventory recommendation 326 module may be implemented to use intelligent analytics to process certain IT sustainability telemetry data, described in greater detail herein, to model the effect of potential IT component acquisition decisions. In certain of these embodiments, the intelligent analytics may be used to model IT component recommendations, based upon certain IT sustainability goals, while balancing such criteria with other factors, such as cost or performance. Examples of such sustainability goals may lowest carbon footprint, lowest power consumption, most modular IT component construction, and so forth.

In various embodiments, the IT sustainability dashboard 328 module may be implemented to perform an IT sustainability dashboard operation. As used herein, an IT sustainability dashboard operation broadly refers to any task, function, operation, procedure, or process performed, directly or indirectly, to provide certain IT sustainability information associated with one or more user's use of IT, such that its performance may assist in reducing the impact of IT on the environment. In various embodiments, the IT sustainability dashboard 328 module may be implemented to provide certain IT sustainability information associated with the procurement, deployment, implementation, operation, management, maintenance, remediation, replacement, repurposing, reassignment, repair, reconfiguration, refurbishing, remanufacturing, resale, recycling, or recovery, or a combination thereof, one or more individual IT components, or sub-components thereof.

In various embodiments, the IT sustainability dashboard information may be provided within a UI, as described in greater detail herein. In certain embodiments, the IT sustainability dashboard information may be used to compare the IT usage habits of one group of users to one or more other groups of users. In these embodiments, the method by which certain IT sustainability dashboard information is selected, and the method by which one or more groups of users is selected for comparison, is a matter of design choice.

In various embodiments, the IT sustainability dashboard 328 module may be implemented to provide a real-time view and assessment of certain IT sustainability metrics. In certain of these embodiments, the provision of a real-time view and assessment of certain IT sustainability metrics may be implemented to achieve a better understanding how different IT sustainability variables contribute to reducing an organization's carbon footprint, achieving their IT sustainability goals, or improving the sustainable use of IT, or a combination thereof. In various embodiments, the provision of a real-time view and assessment of certain IT sustainability metrics may likewise provide an organization IT sustainability-focused data, which in turn may reveal insights that can serve as the basis for making associated IT sustainability decisions.

In various embodiments, the IT inventory data service 330 module may be implemented to perform an IT inventory data service operation. As used herein, an IT inventory data service operation broadly refers to any task, function, operation, procedure, or process performed, directly or indirectly, to provide certain sustainability telemetry as a service (STaaS). In various embodiments, the sustainability telemetry provided as a service may be used in the performance of an IT sustainability operation to procure, deploy, implement, operate, manage, maintain, remediate, replace, repurpose, reassign, repair, reconfigure, refurbish, remanufacture, resell, recycle, or recover, or a combination thereof, one or more individual IT components, or sub-components thereof, such that its performance may assist in reducing the impact of IT on the environment. In various embodiments, the IT inventory data service 330 module may be implemented to provide certain IT sustainability telemetry, described in greater detail herein. In certain of these embodiments, the IT inventory data service 330 module may be implemented to use an API to provide such IT sustainability telemetry.

In various embodiments, the IT sustainability empowerment 316 component may be implemented to perform an IT sustainability empowerment operation. As used herein, an IT sustainability empowerment operation broadly refers to any task, function, operation, procedure, or process performed, directly or indirectly, to empower a user of a particular IT component to perform an IT sustainability operation, described in greater detail herein, whose performance may assist in reducing the impact of IT on the environment. In various embodiments, the IT sustainability empowerment operation may be performed to empower a user to procure, deploy, implement, operate, manage, maintain, remediate, replace, repurpose, reassign, repair, reconfigure, refurbish, remanufacture, resell, recycle, or recover, or a combination thereof, a particular IT component, or a sub-component thereof, throughout its lifecycle.

In various embodiments, the IT sustainability empowerment 316 component may be implemented to include an IT sustainability portal 332 module, an IT sustainability gamification 334 module, an IT component-centric sustainability hub 336 module, and an eCommerce IT sustainability 338 module, or a combination thereof. In various embodiments, an IT sustainability empowerment operation may be implemented to include an IT sustainability portal operation, or a sustainability gamification operation, or an IT component-centric sustainability hub operation, or an eCommerce IT sustainability operation, or a combination thereof, as described in greater detail herein.

In certain embodiments, the IT sustainability portal 332 module, the IT sustainability gamification 334 module, the IT component-centric sustainability hub 336 module, and the eCommerce IT sustainability 338 module, or a combination thereof, may be integrated into an IT component configuration system, an IT component fabrication system, an IT component sustainability resolution system, or an IT component supply chain system, or a combination thereof. In certain embodiments, performance of the IT sustainability portal operation, or the IT sustainability gamification operation, or the IT component-centric sustainability hub operation, or the eCommerce IT sustainability operation, or a combination thereof, may be offered in the form of a cloud-based service. In various embodiments, the IT sustainability empowerment 316 component may be implemented to facilitate engaging user members in assisting an organization achieve its IT sustainability goals. In certain of these embodiments, implementation of the IT sustainability empowerment 316 component may provide users pertinent IT sustainability data that can assist them in tracking their progress and quantifying their IT sustainability activity.

In various embodiments, the IT sustainability portal 332 module may be implemented to perform an IT sustainability portal operation. As used herein, an IT sustainability portal operation broadly refers to any task, function, operation, procedure, or process performed, directly or indirectly, to provide a user certain content related to their IT sustainability activity, through the use of an interactive web portal, familiar to skilled practitioners of the art, such that its provision may assist in reducing the impact of IT on the environment. In various embodiments, the IT sustainability content provided to a user may include sustainability information associated with the procurement, deployment, implementation, operation, management, maintenance, remediation, replacement, repurposing, reassignment, repair, reconfiguration, refurbishment, remanufacture, resale, recycling, or recovery, or a combination thereof, of a particular IT component, or sub-components thereof, throughout their lifecycle.

In various embodiments, the IT sustainability portal 332 module may be implemented to provide a user a way to learn about, engage with, and receive feedback on their IT sustainability activity. In various embodiments, the IT sustainability portal 332 module may be implemented to provide a user a centralized location for certain of their IT sustainability information. In certain of these embodiments, the centralized provision of such IT sustainability information may result in the user finding inspiration, tracking their IT sustainability progress, becoming more educated about IT sustainability, signing up for IT sustainability initiatives, and assisting gaining a better understanding of their organization's IT sustainability goals.

In various embodiments, the IT sustainability gamification 334 module may be implemented to perform an IT sustainability gamification operation. As used herein, an IT sustainability gamification operation broadly refers to any task, function, operation, procedure, or process performed, directly or indirectly, to improve engagement with a user of IT by incorporating elements of online games, such as point scoring, leaderboards, badges, and competition with other users, into the non-game context of IT sustainability, such that their provision may assist in reducing the impact of IT on the environment. In various embodiments, the IT sustainability gamification 334 module may be implemented to combine relevant IT sustainability data and gameplay to gain additional traction for IT sustainability initiatives.

In various embodiments, the IT sustainability gamification 334 module may be implemented to generate feedback for a user in response to certain IT sustainability efforts and to encourage friendly competition with their peers. In various embodiments, the IT sustainability gamification 334 module may be implemented to create more interest, and incentive, for users to participate in reducing the impact of IT on the environment. In various embodiments, the IT sustainability gamification 334 module may be implemented to provide a user information related to the amount of energy their IT components may consume and provide certain IT sustainability recommendations.

In various embodiments, the IT component-centric sustainability hub 336 module may be implemented to perform an IT component-centric sustainability hub operation. As used herein, an IT component-centric sustainability hub operation broadly refers to any task, function, operation, procedure, or process performed, directly or indirectly, to perform one or more IT sustainability operations, described in greater detail herein, associated with a particular type, or class, of IT components, whose performance may assist in reducing the impact of IT on the environment. In various embodiments, the IT component-centric sustainability hub 336 module may be implemented to procure, deploy, implement, operate, manage, maintain, remediate, replace, repurpose, reassign, repair, reconfigure, refurbish, remanufacture, resell, recycle, or recover, or a combination thereof, one or more individual IT components, or sub-components thereof, associated with a particular type, or class, of IT components, throughout their respective lifecycles.

In various embodiments, the IT component-centric sustainability hub 336 module may be implemented to use certain IT sustainability telemetry, described in greater detail herein, to assist users in making more informed IT sustainability decisions. In certain of these embodiments, the IT sustainability telemetry may include information associated with a particular type, or class, of IT component's power consumption. In various embodiments the IT component-centric sustainability hub 336 may be implemented to use certain IT sustainability information to generate recommendations to a user on how to make a particular type, or class, of IT components more sustainable. In various embodiments the IT component-centric sustainability hub 336 may be implemented to provide guidance at an individual user level based upon their associated IT components and usage behaviors. In certain of these embodiments, such recommendations may include reducing the energy consumption of their IT components, carbon credit information, root of trust for a sustainable IT supply chain, and sustainable repair and refurbishment options.

In various embodiments, the eCommerce IT sustainability 338 module may be implemented to perform an eCommerce IT sustainability operation within an eCommerce environment, familiar to those of skill in the art. As used herein, an eCommerce IT sustainability operation broadly refers to any task, function, operation, procedure, or process performed, directly or indirectly, to support an IT sustainability operation, described in greater detail herein, within an eCommerce environment, whose performance may assist in reducing the impact of IT on the environment. In various embodiments, the eCommerce IT sustainability 338 module may be implemented within an eCommerce environment to include sustainability information associated with the procurement, deployment, implementation, operation, management, maintenance, remediation, replacement, repurposing, reassignment, repair, reconfiguration, refurbishment, remanufacture, resale, recycling, or recovery, or a combination thereof, of a particular IT component, or sub-components thereof, throughout their lifecycle.

In various embodiments, the eCommerce IT sustainability 338 module may be implemented to present certain IT sustainability information to a consumer at a point of sale (POS). In certain of these embodiments, the eCommerce IT sustainability 338 module may be implemented to embed various IT sustainability concepts and information into the consumer's purchase path. In various embodiments, the eCommerce IT sustainability 338 module may be implemented to assist user in users in understanding the sustainable impact of their purchase decisions.

In various embodiments, the IT sustainability servicing 318 component may be implemented to perform an IT sustainability servicing operation. As used herein, an IT sustainability servicing operation broadly refers to any task, function, operation, procedure, or process performed, directly or indirectly, to service an IT component, such that their performance may assist in reducing the impact or It on the environment. In various embodiments, the IT sustainability servicing operation may be performed to maintain, remediate, replace, repair, reconfigure, refurbish, remanufacture, recycle, or recover, or a combination thereof, a particular IT component, or a sub-component thereof, throughout its lifecycle.

In various embodiments, the IT component sustainability servicing 318 component may be implemented to include an IT component sustainability servicing diagnostics 340 module, an IT component onsite repair 342 module, an IT component second life planning 344 module, and an IT component multi-use packaging 346 module, or a combination thereof. In various embodiments, an IT sustainability servicing operation may be implemented to include an IT sustainability servicing diagnostics operation, or an IT component onsite repair operation, or an IT component second life planning operation, or an IT component multi-use packaging operation, or a combination thereof, as described in greater detail herein.

In certain embodiments, the IT component sustainability servicing diagnostics 340 module, the IT component onsite repair 342 module, the IT component second life planning 344 module, and the IT component multi-use packaging 346 module, or a combination thereof, may be integrated into an IT component configuration system, an IT component fabrication system, an IT component sustainability resolution system, or an IT component supply chain system, or a combination thereof. In certain embodiments, performance of the IT sustainability servicing diagnostics operation, or the IT component onsite repair operation, or the IT component second life planning operation, or the IT component multi-use packaging operation, or a combination thereof, may be offered in the form of a cloud-based service.

In various embodiments, the IT component sustainability servicing 318 component may be implemented to provide certain intelligence that assists, or facilitates, the diagnosis and servicing of a particular IT component. In various embodiments, the IT component sustainability servicing 318 component may be implemented to reduce friction and environmental impact of servicing certain IT components. In various embodiments, the IT component sustainability servicing 318 component may be implemented to provide intelligent diagnostics that consider IT sustainability factors in combination with speed and cost of serviceability. In various embodiments, the IT component sustainability servicing 318 component may be implemented to support location-aware servicing options that find least impact on the environment for parts delivery and repair, such as using green delivery transport services.

In various embodiments, the IT component sustainability servicing 318 component may be implemented to support self repair of an IT component designed with a modular component architecture. As an example, a user may accidentally drop their laptop computer and crack the display screen. In this example, the user works with their IT support team to determine the best way to replace or repair the display. To continue the example, the user is a remote worker, so they are hoping to avoid a long downtime or a long trip back to their office. To continue the example further, the user's company has deployed laptops designed with a modular component architecture, which are designed to support the goal of simplifying serviceability and dramatically increasing IT sub-component re-use. Accordingly, in this example, there is a possibility that the user's IT support team may be able to ship them a modular display screen. If so, then the user can simply unsnap the broken screen and snap in its replacement, thereby being able to make the repair themselves and reduce their downtime as they did not have to take the laptop in for repair.

In various embodiments, the IT component servicing diagnostics 340 module may be implemented to perform an IT component servicing diagnostics operation. As used herein, an IT component sustainability servicing diagnostics operation broadly refers to any task, function, operation, procedure, or process performed, directly or indirectly, to provide certain IT component diagnostic information, such that it's performance may assist in reducing the impact of IT on the environment. In various embodiments, the IT component sustainability servicing diagnostics 340 module may be implemented to provide certain IT component diagnostic information associated with the implementation, operation, management, maintenance, remediation, repair, reconfiguration, refurbishing, or remanufacturing, or a combination thereof, one or more individual IT components, or sub-components thereof, throughout their respective lifecycles.

In various embodiments, the IT component servicing diagnostics 340 module may be implemented to provide an IT component servicing recommendation. In certain of these embodiments, such an IT component servicing recommendation may include one or more recommendations related to spare parts delivery, IT component, or sub-component, return, closest location of a qualified repair center to balance environmental impact with cost and speed in remediation, and so forth.

In various embodiments, the IT component onsite repair 342 module may be implemented to assist the performance of an IT component onsite repair operation. As used herein, an IT component onsite repair operation broadly refers to any task, function, operation, procedure, or process performed, directly or indirectly, to allow a user to maintain, remediate, replace, repair, or reconfigure, or a combination thereof, a particular IT component, or a sub-component thereof, onsite such that its onsite performance may assist in reducing the impact of IT on the environment. In various embodiments, the IT component onsite repair 342 module may be implemented to provide certain IT component onsite repair information associated with the onsite remediation or repair of one or more individual IT components, or sub-components thereof, throughout their respective lifecycles.

In various embodiments, the IT component onsite repair 342 module may be implemented to allow a user to perform a particular IT component repair operation onsite. In various embodiments, the IT component onsite repair 342 module may be implemented to leverage modular component architectures, described in greater detail herein, and user-serviceable IT component designs, to simplify onsite self-repair by a user. In various embodiments, the IT component onsite repair 342 module may be implemented to support an intelligent repair assistant that guides users through onsite self-repair procedures. In various embodiments, the IT component onsite repair 342 module may be implemented to provide intelligence that provides step-by-step instructions for onsite diagnosis and remediation of certain IT component issues. In certain of these embodiments, the step-by-step instructions may include helpful photographs and video content that simplify the removal and replacement of certain IT components, or sub-components thereof.

As an example, a service technician may run remote diagnostics on a particular IT component to determine the extent of any damage and recommend the best remediation approach. In this example, the technician may decide to search for third party repair centers near the user that may have the correct part to reduce delivery time. Thereafter, an intelligent database of repair parts may be accessed to quickly find the correct repair part and schedule it for delivery. In turn, the user receives a notification that the correct repair part will arrive the next morning. As planned, the repair part arrives in reusable packaging. The user removes the new part and uses it to replace the broken part, which is then packed in the reusable package and sent back for refurbishment. In this example, the packaging used for the replacement part has been designed to be reused multiple times and comes with a short explanation on how multi-use packaging uses much less energy than conventional packaging.

In various embodiments, the IT component second life planning 344 module may be implemented to perform an IT component second life planning operation. As used herein, an IT component second life planning operation broadly refers to any task, function, operation, procedure, or process performed, directly or indirectly, to plan the reuse of a particular IT component, or a sub-component thereof, such that it may assist in reducing the impact of IT on the environment. In various embodiments, the IT component second-life planning 344 module may be implemented to allow a user to plan the redeployment, reimplementation, operation, replacement, repurposing, reassignment, reconfiguration, refurbishment, remanufacture, resale, recycling, or recovery, or a combination thereof, of one or more individual IT components, or sub-components thereof, throughout their respective lifecycles.

In various embodiments, the IT component second life planning 344 module may be implemented to provide certain IT sustainability intelligence to assist organization in extending the lifecycle of their IT components. In certain of these embodiments, the provided IT sustainability intelligence may be used to plan, build, and deploy certain refurbished IT components to new users at the lowest cost and impact to the environment. In various embodiments, the IT component second life planning 344 module may be implemented to leverage a modular IT component architecture that supports standardized parts, which can assist in making it easier to harvest parts and reduce IT component repair times.

In various embodiments, the IT component multi-use packaging 346 module may be implemented to perform an IT component multi-use packaging operation. As used herein, an IT component multi-use packaging operation broadly refers to any task, function, operation, procedure, or process performed, directly or indirectly, to utilize multi-use packaging for the packaging, and transport, of a particular IT component, or a sub-component thereof, such that it may assist in reducing the impact of IT on the environment. In various embodiments, the IT component multi-use packaging 346 module may be implemented to facilitate the procurement, deployment, replacement, repurposing, reassignment, repair, reconfiguration, refurbishment, remanufacturing, resale, recycling, or recovery, or a combination thereof, of one or more individual IT components, or sub-components thereof, throughout their respective lifecycles.

In various embodiments, the IT component multi-use packaging 346 module may be implemented to facilitate the use of multi-use packaging designed for reuse to make the return of certain IT components, or subcomponents thereon, easier while assisting in reducing the effect of IT on the environment. In certain of these embodiments, such multi-use packaging may incorporate features such as return automation to assist user in recycling defective or old IT components, or sub-components thereof. In various embodiments, the IT component multi-use packaging 346 module may be implemented to make repacking an IT component, or sub-component thereof, and returning it easier by tracking the provision of returnable packaging to a user, and once it is packed, its delivery to another destination.

To continue a prior example, a multi-use package containing a defective IT component, or sub-component thereof, may be picked up by a delivery service, which also manages a harvesting center, where the defective IT component is disassembled and sorted for refurbishment, recycling, or spare parts. In certain embodiments, an artificial intelligence (AI) driven tracking system may be implemented to match new surplus IT component modules in other locations to find the best new IT component configuration that minimizes shipping. In this example, the user's company may receive a notification that they will receive credits for the IT component parts that were harvested, or a discounted offer on a refurbished product that will be used by another user.

In various embodiments, the IT environment sustainability management 320 component may be implemented to perform an IT environment sustainability management operation. As used herein, an IT environment sustainability management operation broadly refers to any task, function, operation, procedure, or process performed, directly or indirectly, to manage certain aspects of IT sustainability, described in greater detail herein, within an IT environment, likewise described in greater detail herein. In various embodiments, the IT environment sustainability management operation may be performed to manage the procurement, deployment, implementation, operation, management, maintenance, remediation, replacement, repurposing, reassignment, repair, reconfiguration, refurbishment, remanufacturing, resale, recycling, or recovery, or a combination thereof, of an IT component, or sub-component thereof, throughout its lifecycle, such that it may reduce the impact of IT on the environment.

In various embodiments, the IT environment sustainability management 320 component may be implemented to include an IT component lifecycle planning intelligence 348 module, an IT component inventory product architecture 350 module, an IT component marketplace as a service (MaaS) 352 module, and an IT component sustainability resolution 354 module, or a combination thereof. In various embodiments, an IT environment sustainability management operation may be implemented to include an IT component lifecycle planning intelligence operation, or a modular IT component architecture operation, or an IT component MaaS operation, or an IT component sustainability resolution operation, or a combination thereof, as described in greater detail herein.

In various embodiments, the IT component lifecycle planning intelligence 348 module may be implemented to perform an IT component lifecycle planning intelligence operation. As used herein, an IT component lifecycle planning intelligence operation broadly refers to any task, function, operation, procedure, or process performed, directly or indirectly, to provide certain IT sustainability information associated with the performance of a particular circular IT sustainability operation, described in greater detail herein, such that it may assist in reducing the impact of a particular IT component, or a sub-component thereof, on the environment, throughout its lifecycle. In various embodiments, the IT component lifecycle planning intelligence 348 module may be implemented to provide certain IT sustainability information associated with the procurement, deployment, implementation, operation, management, maintenance, remediation, replacement, repurposing, reassignment, repair, reconfiguration, refurbishment, remanufacture, resale, recycling, or recovery, or a combination thereof, of one or more individual IT components, or sub-components thereof, throughout their respective lifecycles.

In various embodiments, the IT component lifecycle intelligence 348 module may be implemented to support the implementation of a circular IT component sustainability ecosystem, described in greater detail herein. In various embodiments, the IT component lifecycle planning intelligence 348 module may be implemented to leverage certain information associated with a circular IT component sustainability ecosystem to generate recommendation for how to best repurpose one or more IT components, or sub-components thereof. In various embodiments, the IT component lifecycle planning intelligence 348 module may be implemented in combination with a circular IT component sustainability ecosystem to intelligently model and plan scenarios for the most effective use certain IT components, and sub-components thereof, that optimize their lifespan, modularity, implementation, harvesting, re-use, and cost recovery.

In various embodiments, the IT component lifecycle planning intelligence 348 module may be implemented to facilitate the cascaded use of a particular IT component, or a sub-component thereof. As used herein, cascaded use broadly refers to the sequential and consecutive use of an IT component, or a sub-component thereof, as described in greater detail herein, such that the impact of IT on the environment may be reduced. In various embodiments, such cascaded use may result in a particular IT component, or sub-component thereof, having multiple lifecycles, each associated with a particular use, or user.

In various embodiments, the cascaded use of an IT component, or sub-component thereof, may include its redeployment, reassignment, reconfiguration, reimplementation, re-use, recycling, or recovery, as described in greater detail herein. In various embodiments, an IT component designed with a modular IT component architecture may facilitate its cascaded use, by making it easier to replace, reconfigure, re-implement, re-use, recycle, or recover. Likewise, in various embodiments, an IT component may be designed with a modular IT component architecture to reduce its time to build, or repair, which may in turn reduce the amount of electronic waste (e-waste) due to a particular IT component being more expensive to repair than to dispose of. In certain of these embodiments, the use of a modular IT component architecture may likewise facilitate the refurbishment of a particular IT component, or sub-component thereof, which may result in a longer useful life and the consumption of less energy throughout its lifecycle.

In various embodiments, the modular IT component architecture 350 module may be implemented to perform a modular IT component architecture operation. As used herein, a modular IT component architecture operation broadly refers to any task, function, operation, procedure, or process performed, directly or indirectly, to perform an IT sustainability operation in accordance with a modular IT component architecture, described in greater detail herein, such that it may reduce IT impact on the environment. In various embodiments, the modular IT component architecture 350 module may be implemented to facilitate the procurement, deployment, implementation, operation, management, maintenance, remediation, replacement, repurposing, reassignment, repair, reconfiguration, refurbishment, remanufacturing, resale, recycling, or recovery, or a combination thereof, of one or more individual IT components, or sub-components thereof, according to a particular modular IT component architecture throughout their respective lifecycles. In various embodiments, the modular IT component architecture 350 module may be implemented to support the implementation of a circular IT component sustainability ecosystem, described in greater detail herein.

In various embodiments, the IT component marketplace as a service (MaaS) 352 module may be implemented to perform an IT component MaaS operation. As used herein, an IT component MaaS operation broadly refers to any task, function, operation, procedure, or process performed, directly or indirectly, to perform an IT sustainability operation, described in greater detail herein, as an IT component marketplace service, whose performance may assist in reducing the impact of IT on the environment. In various embodiments, the IT component MaaS 352 module may be implemented to perform one or more IT component marketplace services without the physical involvement of a user.

In various embodiments, the IT component MaaS 352 module may be implemented to support the implementation of a circular IT component sustainability ecosystem, described in greater detail herein. In various embodiments, the IT component MaaS 352 module may be implemented to provide a broader marketplace to find and sell a particular IT component, or subcomponent thereof, whose reuse has been cascaded. In various embodiments, the IT component MaaS 352 module may be implemented to enable an ecosystem of third parties to manage the brokering of certain IT components, and sub-components thereof.

In various embodiments, the IT component sustainability resolution 354 module may be implemented to perform an IT component sustainability resolution operation. As used herein, an IT component sustainability resolution operation broadly refers to any task, function, operation, procedure, or process performed, directly or indirectly, to resolve the disposition of a particular IT component, or a sub-component thereof, at any point in its lifecycle, such that it may assist in reducing the impact of IT on the environment. In various embodiments, the IT component sustainability resolution 354 module may be implemented to resolve whether an IT component, or sub-component thereof, should be procured, deployed, implemented, operated, managed, maintained, remediated, replaced, repurposed, reassigned, repaired, reconfigured, refurbished, remanufactured, resold, recycled, or recovered, or a combination thereof, a particular point in their lifecycle. In certain of these embodiments, the use of a modular IT component architecture, described in greater detail herein, may facilitate resolving the disposition of a particular IT component, or sub-component thereof, which may result in a longer useful life and the consumption of less energy throughout its lifecycle.

Figure 4:
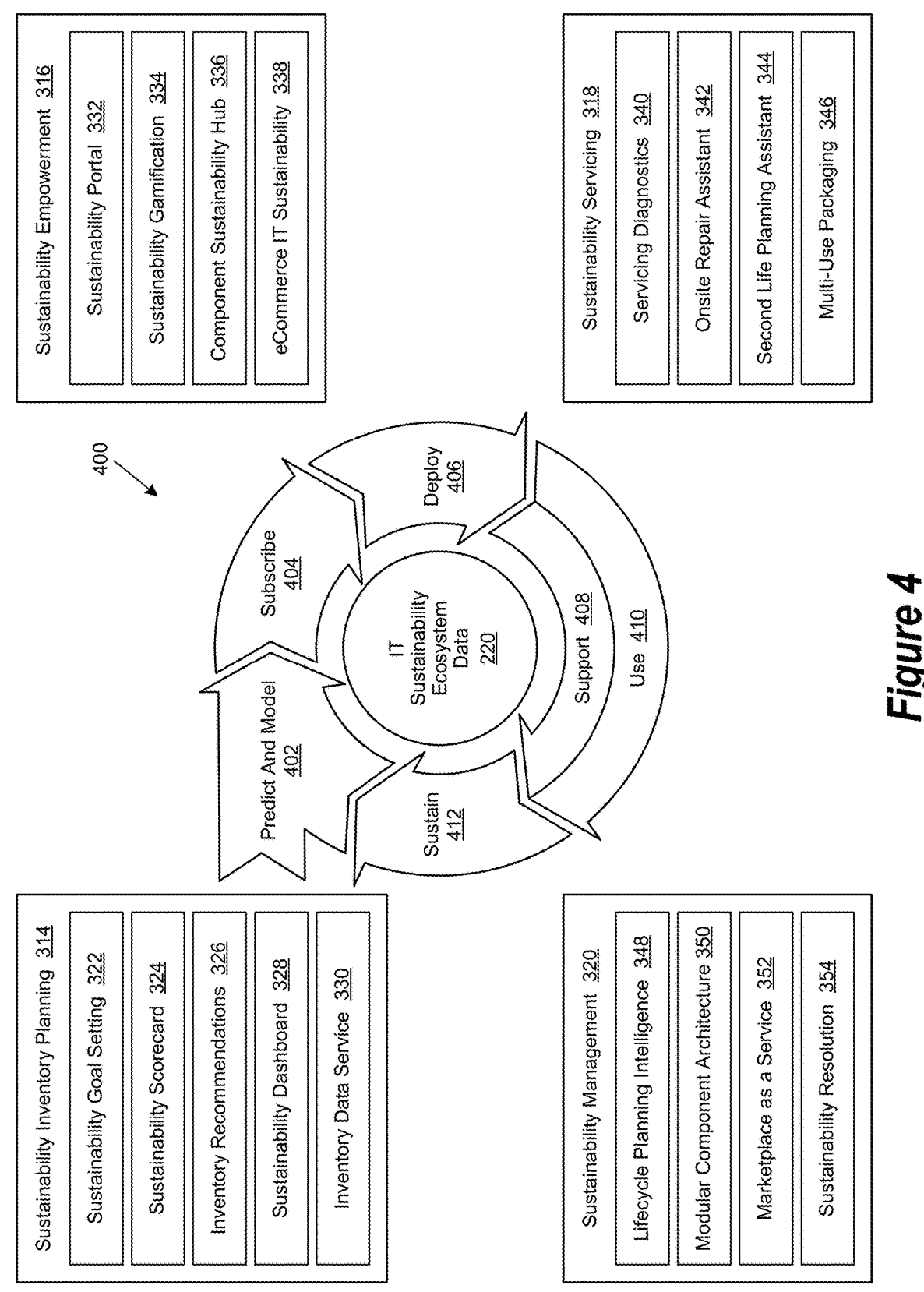
FIG. 4 shows a block diagram of a circular process flow of the performance of certain IT sustainability operations.

FIG. 4 shows a block diagram of a circular process flow of certain information technology (IT) sustainability operations executed in accordance with an embodiment of the invention. In various embodiments, the circular process flow of IT sustainability operations 400 shown in FIG. 4 may be implemented to include a predict and model 402 step, a subscribe 404 step, a deploy 406 step, a support 408 step, a use 410 step, and a sustain 412 step. In certain of these embodiments, the support 408 and use 410 steps may be performed concurrently.

In various embodiments, certain IT sustainability ecosystem data 220, described in greater detail herein, may be used in the performance of the predict and model 402, subscribe 404, deploy 406, support 408, use 410, and sustain 412 steps of the circular process flow of IT sustainability operations 400. In certain embodiments, the performance of the predict and model 402, subscribe 404, deploy 406, support 408, use 410, and sustain 412 steps of the circular process flow of IT sustainability operations 400 may be facilitated through the implementation of a modular IT component architecture, described in greater detail herein. In various embodiments, the circular process flow of IT sustainability operations 400 may be implemented to achieve certain IT sustainability goals, such as lowering the overall carbon footprint of IT, or improving the cascaded use of IT components, within a modern IT sustainability ecosystem, described in greater detail herein.

In various embodiments, one or more modules 322, 324, 326, 328, 330 of the IT sustainability inventory planning 314 component of an IT sustainability system, described in greater detail herein, may be used in the performance of the predict and model 402, and sustain 412, steps of the circular process flow of IT sustainability operations 400. In various embodiments, one or more modules 332, 334, 336, 338 of the IT sustainability empowerment 316 component of the IT sustainability system, likewise described in greater detail herein, may be used in the performance of the subscribe 404, and deploy 406, steps of the circular process flow of IT sustainability operations 400. In various embodiments, one or more modules 340, 342, 344, 346 of the IT component sustainability servicing 318 component of the IT sustainability system, described in greater detail herein, may be used in the performance of the deploy 406, support 408, and use 410, steps of the circular process flow of IT sustainability operations 400. In various embodiments, one or more modules 348, 350, 352, 354 of the IT environment sustainability management 320 component of the IT sustainability system, likewise described in greater detail herein, may be used in the performance of the deploy 406, support 408, and use 410, steps of the circular process flow of IT sustainability operations 400.

In various embodiments, the predict and model 402 step of the circular process of IT component sustainability operations 400 may be performed to establish requirements, standards and goals for the procurement, deployment, implementation, operation, management, maintenance, remediation, replacement, repurposing, reassignment, repair, reconfiguration, refurbishment, remanufacture, resale, recycling, or recovery, or a combination thereof, of a particular IT component, as described in greater detail herein. In certain of these embodiments, the predict and model 402, and sustain 412, step of the circular process of IT component sustainability operations 400, individually or in combination, may be performed to assess how well a particular user's, or an organization's, current inventory of IT components matches its IT sustainability requirements, standards, and goals. In certain of these embodiments, the assessment may be provided in the form of an IT sustainability scorecard, described in greater detail herein, along with recommendations for improvement. In various embodiments, the predict and model 402, and sustain 412, steps of the circular process of IT component sustainability operations 400, individually or in combination, may be performed to define IT sustainability data, and associated security safeguards, needed to deliver sustainable supply chain authentication and information.

In various embodiments, the predict and model 402, and sustain 412, steps of the circular process of IT component sustainability operations 400, individually or in combination, may be performed to predict the carbon footprint associated with the procurement, deployment, implementation, operation, management, maintenance, remediation, replacement, repurposing, reassignment, repair, reconfiguration, refurbishment, remanufacture, resale, recycling, or recovery, or a combination thereof, of a particular IT component over its lifecycle. In various embodiments, the subscribe 404 and deploy 406 steps of the circular process of IT component sustainability operations 400, individually or in combination, may be performed to reduce the amount of waste at typical end-of-life (EOL) for a particular IT component by creating additional options for the procurement, deployment, implementation, operation, management, maintenance, remediation, replacement, repurposing, reassignment, repair, reconfiguration, refurbishment, remanufacture, resale, recycling, or recovery, or a combination thereof, of a particular IT component, or sub-components thereof. In various embodiments, the deploy 406, support 408, and use 410 steps of the circular process of IT component sustainability operations 400, individually or in combination, may be performed to achieve certain IT sustainability servicing goals. In various embodiments, the deploy 406, support 408, and use 410 steps of the circular process of IT component sustainability operations 400, individually or in combination, may likewise be performed to apply sustainability best practices that reduce the impact on the environment from repairing IT components and shipping repair parts or replacement IT components. In various embodiments, the support 408 and use 410 steps of the circular process of IT component sustainability operations 400, individually or in combination, may be performed to engage users and create a shared understanding and commitment to IT sustainability initiatives and goals.

Figure 5:
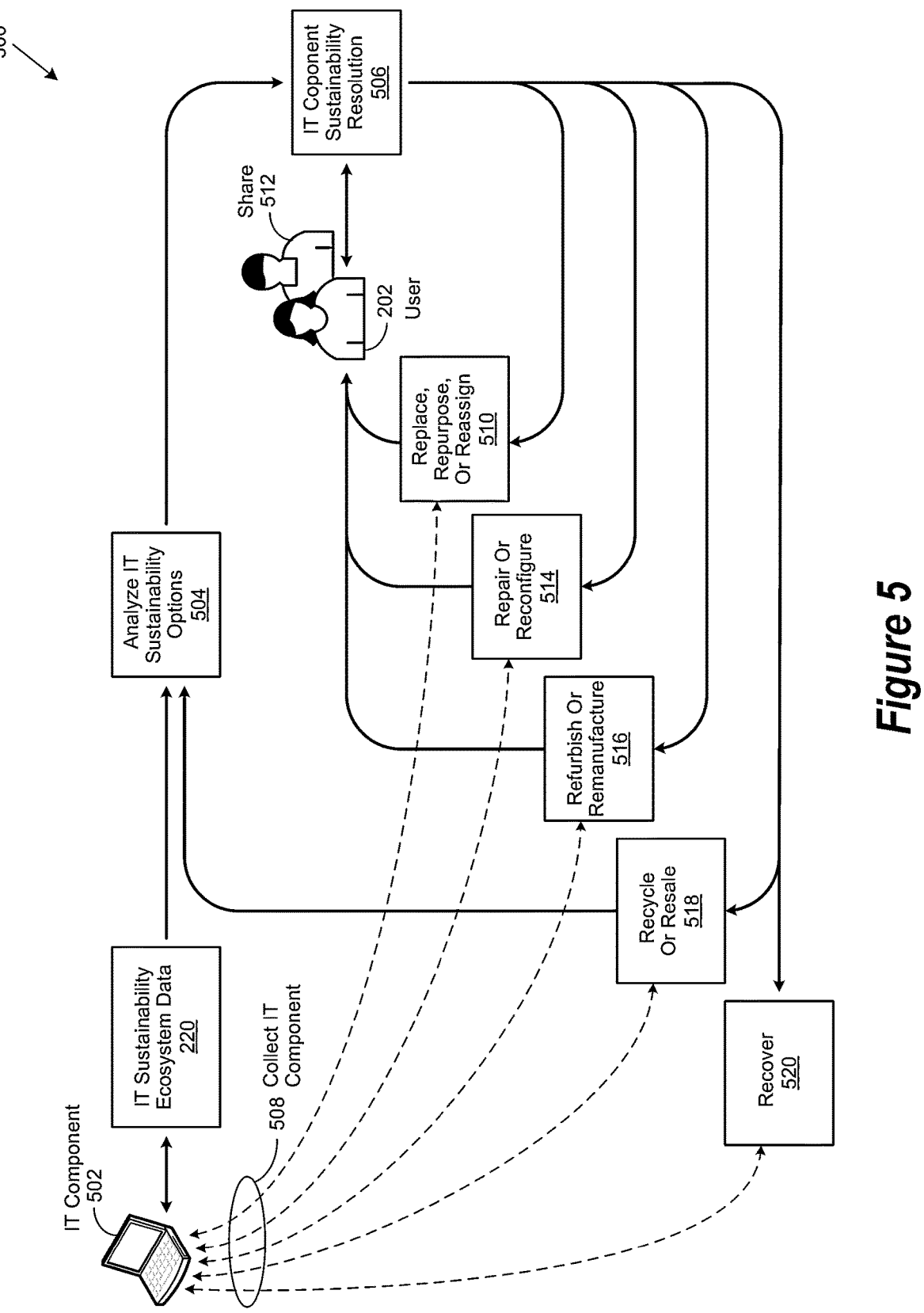
FIG. 5 is a block diagram showing a process flow of certain information technology (IT) component sustainability operations performed within a circular IT component sustainability ecosystem.

FIG. 5 is a block diagram showing a process flow of certain information technology (IT) component sustainability operations performed within a circular IT component sustainability ecosystem implemented in accordance with an embodiment of the invention. In various embodiments, a circular IT component ecosystem 500 may be established by monitoring the use of one or more IT components 502 to collect associated IT sustainability ecosystem data 220, as described in greater detail herein. In various embodiments, the collected IT sustainability ecosystem data 220 is then analyzed 504 to determine certain IT options for each IT component 502. In various embodiments, the resulting analysis is then processed by one or more components of an IT sustainability ecosystem console, described in greater detail herein, to generate an IT component sustainability resolution 506 for each IT component 502.

In certain embodiments, the IT sustainability resolution 506 may be to collect 508 a particular IT component 202 and replace, repurpose, or reassign 510 it. In certain embodiments, the IT sustainability resolution 506 may be to collect 508 a particular IT component 202 and share 512 it with another user 202. In certain embodiments, the IT sustainability resolution 506 may be to collect 508 a particular IT component 202 and repair or reconfigure it 514 it.

In certain embodiments, the IT sustainability resolution 506 may be to collect 508 a particular IT component 202 and refurbish or remanufacture 516 it. In certain embodiments, the IT sustainability resolution 506 may be to collect 508 a particular IT component 202 and recycle or resell 518 it. In certain embodiments, the IT sustainability resolution 506 may be to collect 508 a particular IT component 202 and recover 520 its remaining value. Skilled practitioners of the art will recognize that many such IT sustainability resolutions 506 are possible. Accordingly, the foregoing is not intended to limit the spirit, scope, or intent of the invention.

Figure 6:
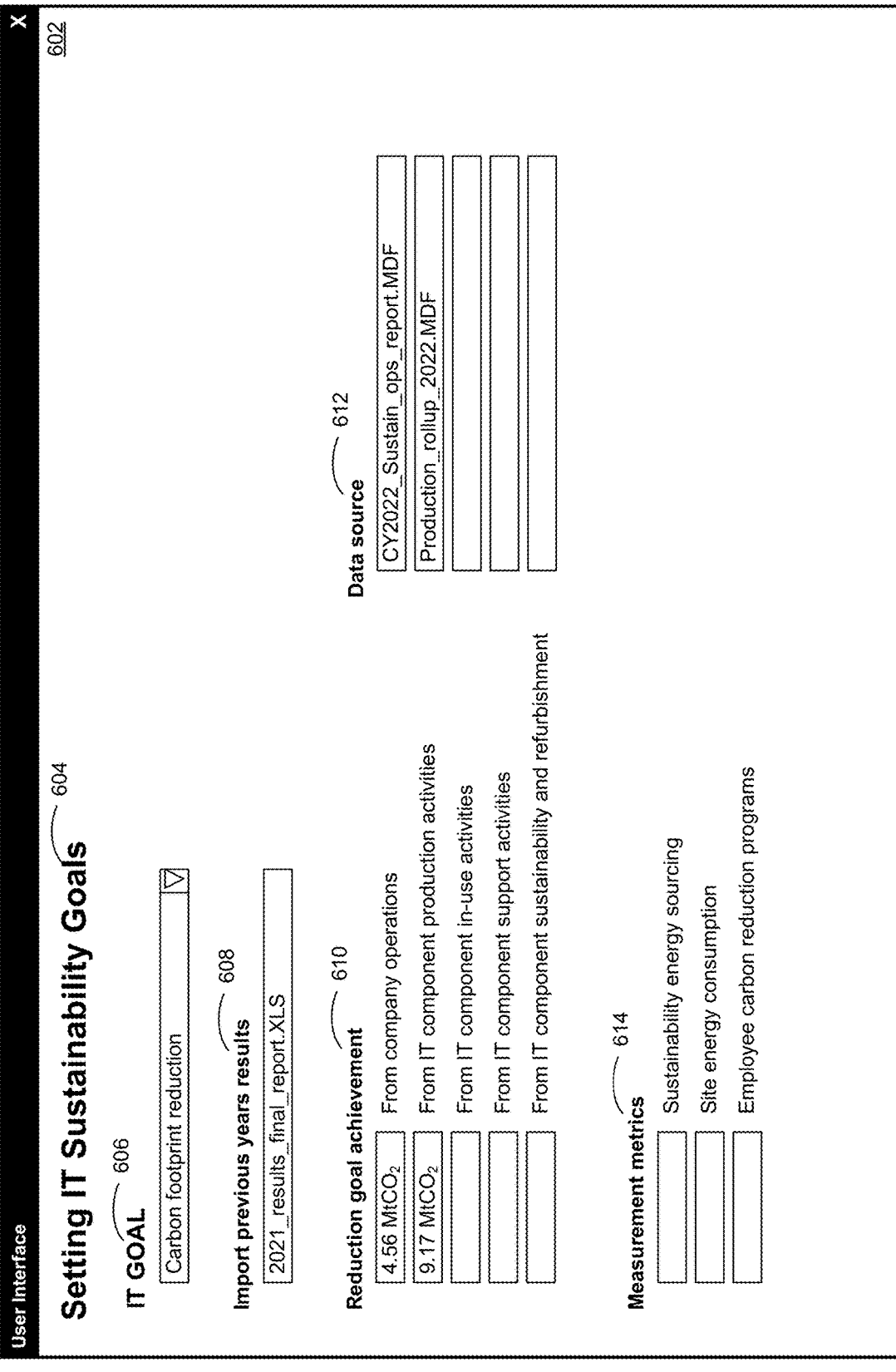
FIG. 6 shows a user interface (UI) implemented to enable the setting of certain IT sustainability goals.

FIG. 6 shows a user interface (UI) implemented in accordance with an embodiment of the invention to enable the setting of certain information technology (IT) sustainability goals. In various embodiments, certain IT sustainability information may be displayed within a UI 602. In various embodiments, the UI 602 may be implemented to include a "Setting IT Goals" 604 window. In various embodiments, the "Setting IT Goals" 604 window may be implemented to receive certain user input information, which may in turn be provided to an IT sustainability goal setting module, described in the descriptive text associated with FIG. 3. In various embodiments, the IT sustainability goal setting module may be implemented to process the user input information to generate certain IT sustainability information, which in certain embodiments may be displayed within the "Setting IT Goals" 604 window.

For example, as shown in FIG. 6, the user input may be provided through a drop-down menu selection associated with a particular IT sustainability goal 606. To continue the example, the IT sustainability information displayed within the "Setting IT Goals" 604 window may include certain "Reduction goal achievement" 610, "Data source" 612, and "Measurement metrics" 614 information display fields. In this example, the "Data source" 612 and "Measurement metrics" 614 information fields may respectively be implemented to provide the source of information used to generate the IT sustainability information displayed within the "Reduction goal achievement" 610 information field and the metrics used to measure it.

Figure 7:
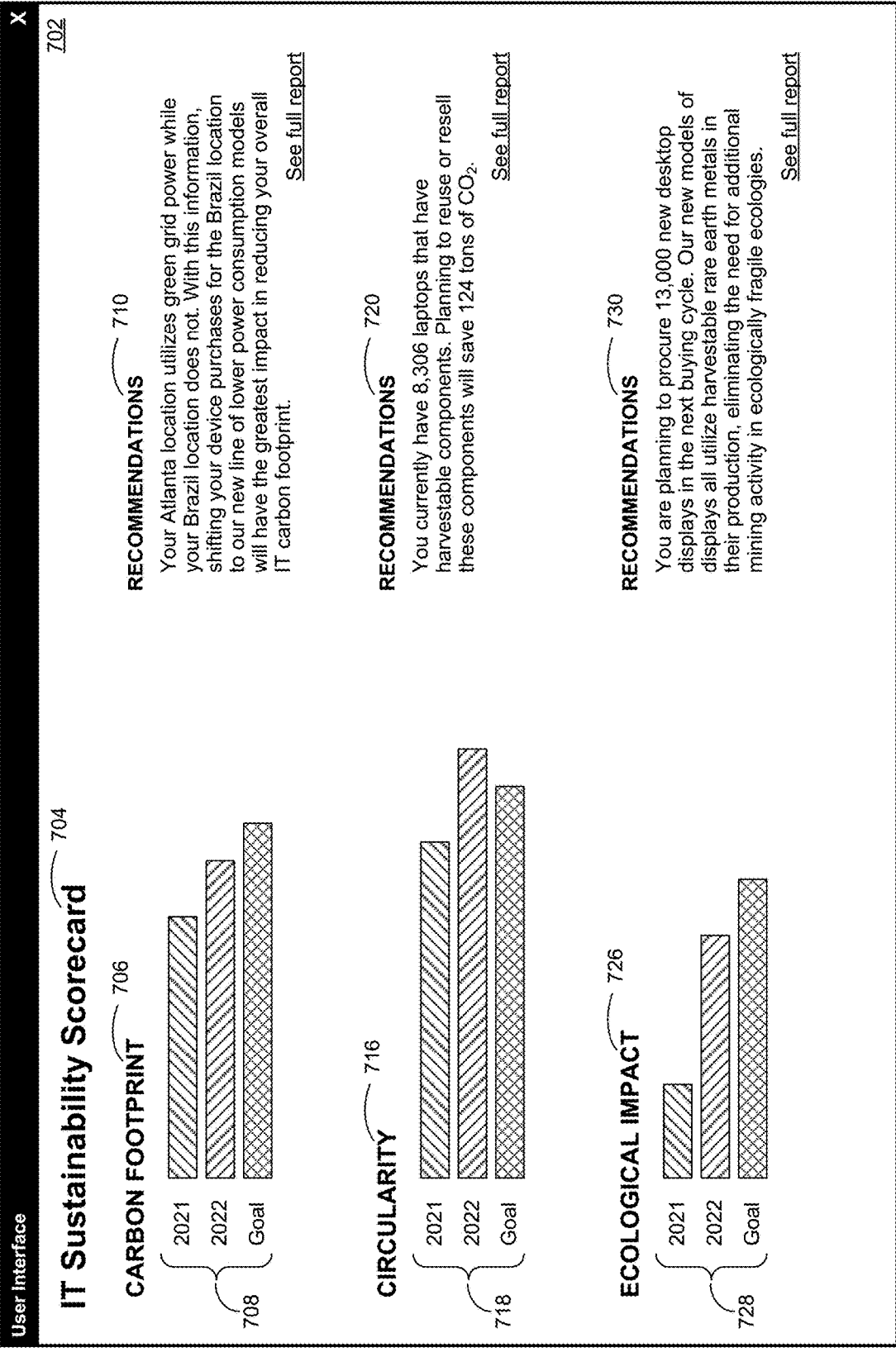
FIG. 7 shows a UI implemented to provide certain IT sustainability information in the form of an IT sustainability scorecard.

FIG. 7 shows a user interface (UI) implemented to provide certain information technology (IT) sustainability information in the form of an IT sustainability scorecard. In various embodiments, certain IT sustainability information may be displayed within a UI 702. In various embodiments, the UI 702 may be implemented to include a "IT Sustainability Scorecard" 704 window.

In various embodiments, the "IT Sustainability Scorecard" 704 window may be implemented to display certain IT sustainability information associated with a particular organization. In various embodiments, the IT sustainability information displayed within the "IT Sustainability Scorecard" 704 window may be generated as a result of certain operations performed by an IT sustainability scorecard module, described in the descriptive text associated with FIG. 3. In certain of these embodiments, the IT sustainability information associated with a particular organization may be displayed in the form of an IT sustainability scorecard, likewise described in greater detail herein.

In various embodiments, the IT sustainability information displayed within the "IT Sustainability Scorecard" 704 window may include information associated with a particular organization's achievement of certain carbon footprint 706 goals, circular IT component sustainability 716 goals, described in greater detail herein, and ecological impact 726 goals. In various embodiments, the historical achievement of the organization's carbon footprint 706, circular IT component sustainability 716, and ecological impact 726 goals may be respectively represented 708, 718, 728 in a graphical format within "IT Sustainability Scorecard" 704 window. In various embodiments, certain recommendations may be respectively provided 710, 720, 730 within the "IT Sustainability Scorecard" 704 window to assist the organization achieve their carbon footprint 706, circular IT component sustainability 716, and ecological impact 726 goals.

Figure 8:
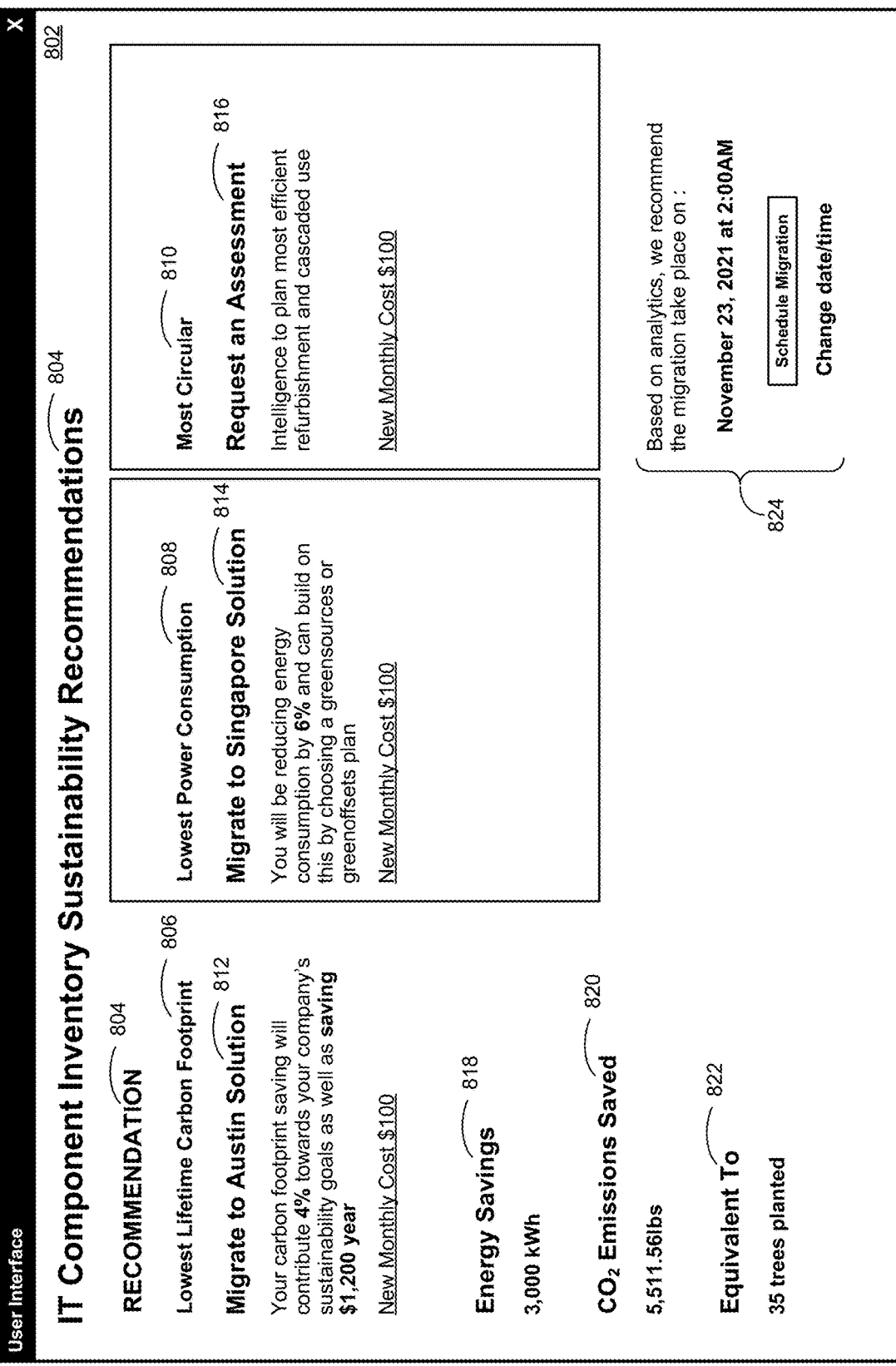
FIG. 8 shows a UI implemented to provide certain IT component inventory sustainability recommendations.

FIG. 8 shows a user interface (UI) implemented in accordance with an embodiment of the invention to provide certain information technology (IT) component inventory sustainability recommendations. In various embodiments, certain IT sustainability information may be displayed within a UI 802. In various embodiments, the UI 802 may be implemented to include a "IT Component Inventory Recommendations" 804 window.

In various embodiments, the "IT Component Inventory Recommendations" 804 window may be implemented to display certain IT sustainability information associated with a particular user or organization. In various embodiments, the IT sustainability information displayed within the "IT Component Inventory Recommendations" 804 window may be generated as a result of certain operations performed by an IT component inventory recommendation module, described in the descriptive text associated with FIG. 3. In certain of these embodiments, the IT sustainability information associated with a particular organization may be displayed in the form of one or more IT component inventory sustainability recommendations 804.

In various embodiments, the one or more IT component inventory sustainability recommendations 804, as shown in FIG. 8, may be respectively presented within a "Lowest Lifetime Carbon Footprint" 806 sub-window, a "Lowest Power Consumption" 808 sub-window, and a "Most Circular" 810 sub-window, and so forth. In various embodiments, a summary of a particular IT component inventory sustainability recommendation may be respectively presented 812, 814, 816 within the "Lowest Lifetime Carbon Footprint" 806, "Lowest Power Consumption" 808, and "Most Circular" 810 sub-window, and so forth. In various embodiments, certain IT sustainability information related to a particular IT component inventory sustainability recommendation may likewise be respectively presented 812, 814, 816 within the "Lowest Lifetime Carbon Footprint" 806, "Lowest Power Consumption" 808, and "Most Circular" 810 sub-window, and so forth. For example, as shown in FIG. 8, the "Lowest Lifetime Carbon Footprint" 806 sub-window has been implemented to display certain Energy Savings" 818, "CO$_2$ Emissions" 820, "Equivalent To" 822, and recommendation detail 824 information.

Figure 9:
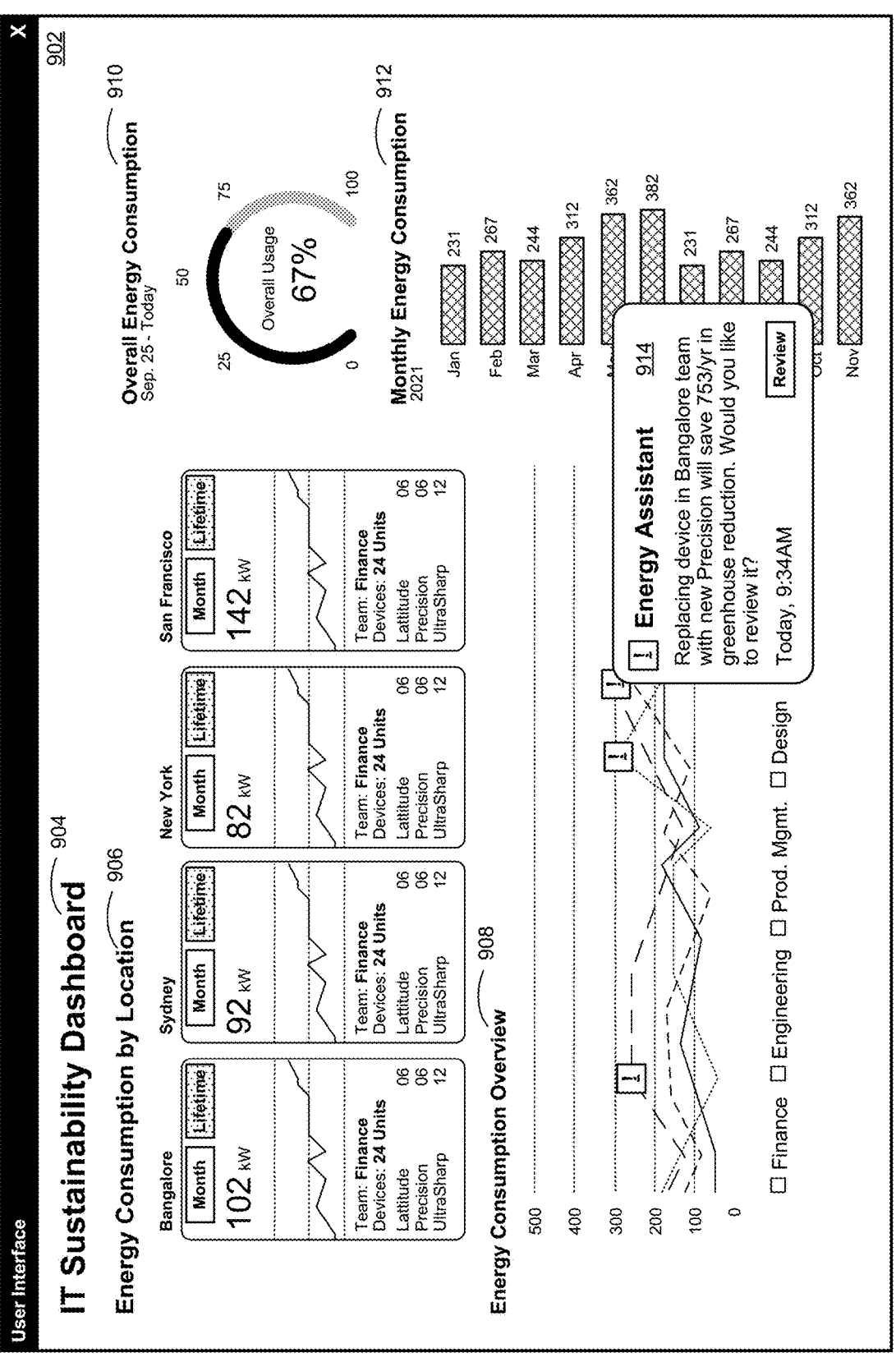
FIG. 9 shows a UI implemented to provide certain IT sustainability information in the form of an IT sustainability dashboard.

FIG. 9 shows a user interface (UI) implemented in accordance with an embodiment of the invention to provide certain information technology (IT) sustainability information in the form of an IT sustainability dashboard. In various embodiments, certain IT sustainability information may be displayed within a UI 902. In various embodiments, the UI 902 may be implemented to include an "IT Sustainability Dashboard" 904 window.

In various embodiments, the "IT Sustainability Dashboard" 904 window may be implemented to display certain IT sustainability information associated with a particular user or organization. In various embodiments, the IT sustainability information displayed within the "IT Sustainability Dashboard" 904 window may be generated as a result of certain operations performed by an IT sustainability dashboard module, described in the descriptive text associated with FIG. 3. In various embodiments, the IT sustainability information provided by the IT sustainability dashboard module may be implemented to be displayed graphically within the "IT Sustainability Dashboard" 904 window. For example, as shown in FIG. 9, the IT sustainability information graphically displayed within the "IT Sustainability Dashboard" 904 window may include information related to "Energy Consumption by Location" 906, an "Energy Consumption Overview" 908, "Overall Energy Consumption" 910, and "Monthly Energy Consumption" 912. In certain embodiments, the IT sustainability information displayed within the "IT Sustainability Dashboard" 904 window may likewise include an "Energy Assistant" 914 window, implemented to provide certain associated IT sustainability information.

In various embodiments, the energy consumption information used to generate the "Energy Consumption Overview" 908 graph may include certain information associated with the mix of IR component energy sources used at each location, which in turn may have an affect on CO 2 emission factors. For example, high energy usage only impacts IT sustainability goals if high carbon emission energy sources are used. Various embodiments of the invention reflect an appreciation that it is not uncommon for local government regulations to have fines associated with exceeding certain carbon footprint thresholds. Accordingly, in certain of these embodiments, various metrics associated with the carbon footprint of one or more IT components may be tracked and incorporated into the generation of one or more cost assessment recommendations.

Likewise, various embodiments of the invention reflect that many organizations are setting net zero emissions goals. Various embodiments of the invention likewise reflect an appreciation that it is common for an organization to purchase carbon offsets to achieve such goals, which incurs an additional cost. Accordingly, in certain of these embodiments, such costs may likewise be incorporated into generation of one or more cost assessment recommendations.

Figure 10:
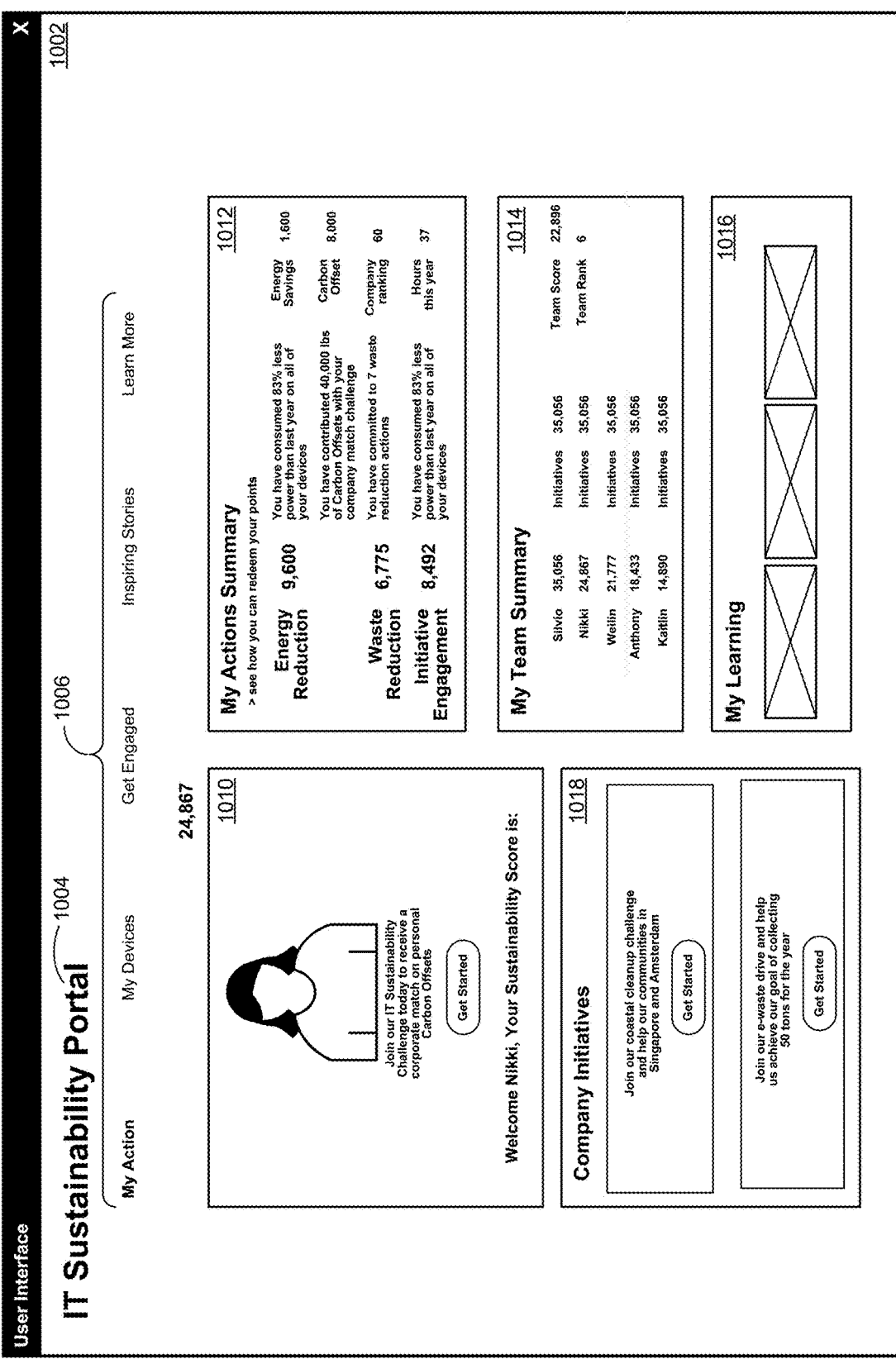
FIG. 10 shows a UI implemented to provide certain IT sustainability information in the form of an IT sustainability portal.

FIG. 10 shows a user interface (UI) implemented in accordance with an embodiment of the invention to provide certain information technology (IT) sustainability information in the form of an IT sustainability portal. In various embodiments, certain IT sustainability information may be displayed within a UI 1002. In various embodiments, the UI 1002 may be implemented to include an "IT Sustainability Portal" 1004 window.

In various embodiments, the "IT Sustainability Portal" 1004 window may be implemented to display certain IT sustainability information associated with a particular user. In various embodiments, the IT sustainability information displayed within the "IT Sustainability Portal" 1004 window may be generated as a result of certain operations performed by an IT sustainability portal module, described in the descriptive text associated with FIG. 3. In various embodiments, as shown in FIG. 10, the "IT Sustainability Portal" 1004 window may be implemented to include a menu 1006. In various embodiments, the "IT Sustainability Portal" 1004 window may likewise be implemented to include a "Sustainability Score" 1010 sub-window, a "Company Initiatives" 1012 sub-window, a "My Actions Summary" 1012 sub-window, a "My Team Summary" 1014 sub-window, and a "My Learning" 1016 sub-window.

Figure 11:
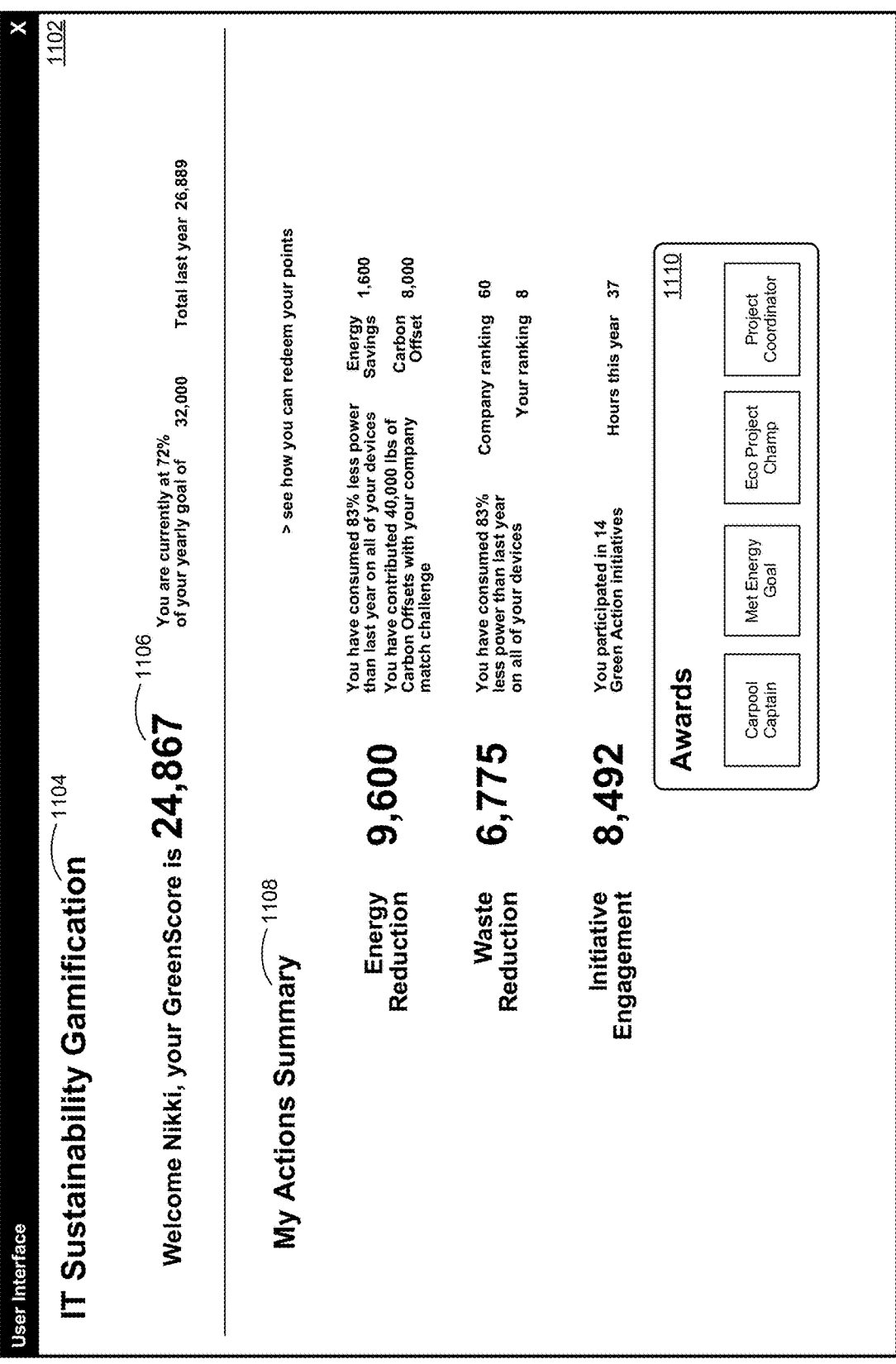
FIG. 11 shows a UI implemented to provide certain IT sustainability information in the context of IT sustainability gamification.

FIG. 11 shows a user interface (UI) implemented in accordance with an embodiment of the invention to provide certain information technology (IT) sustainability information in the context of IT sustainability gamification. In various embodiments, certain IT sustainability information may be displayed within a UI 1102. In various embodiments, the UI 1102 may be implemented to include an "IT Sustainability Gamification" 1104 window.

In various embodiments, the "IT Sustainability Gamification" 1104 window may be implemented to display certain IT sustainability information associated with a particular user and their peers. In various embodiments, the IT sustainability information displayed within the "IT Sustainability Gamification" 1104 window may be generated as a result of certain operations performed by an IT sustainability gamification module, described in the descriptive text associated with FIG. 3. In certain of these embodiments, the IT sustainability information associated with particular users, and their peers, may be displayed in the context of IT sustainability gamification, described in greater detail herein. In various embodiments, the "IT Sustainability Gamification" 1104 window may be implemented to include a user gamification score summary 1106 portion, a "My Actions Summary" 1108 portion, and an "Awards" 1110 window.

Figure 12:
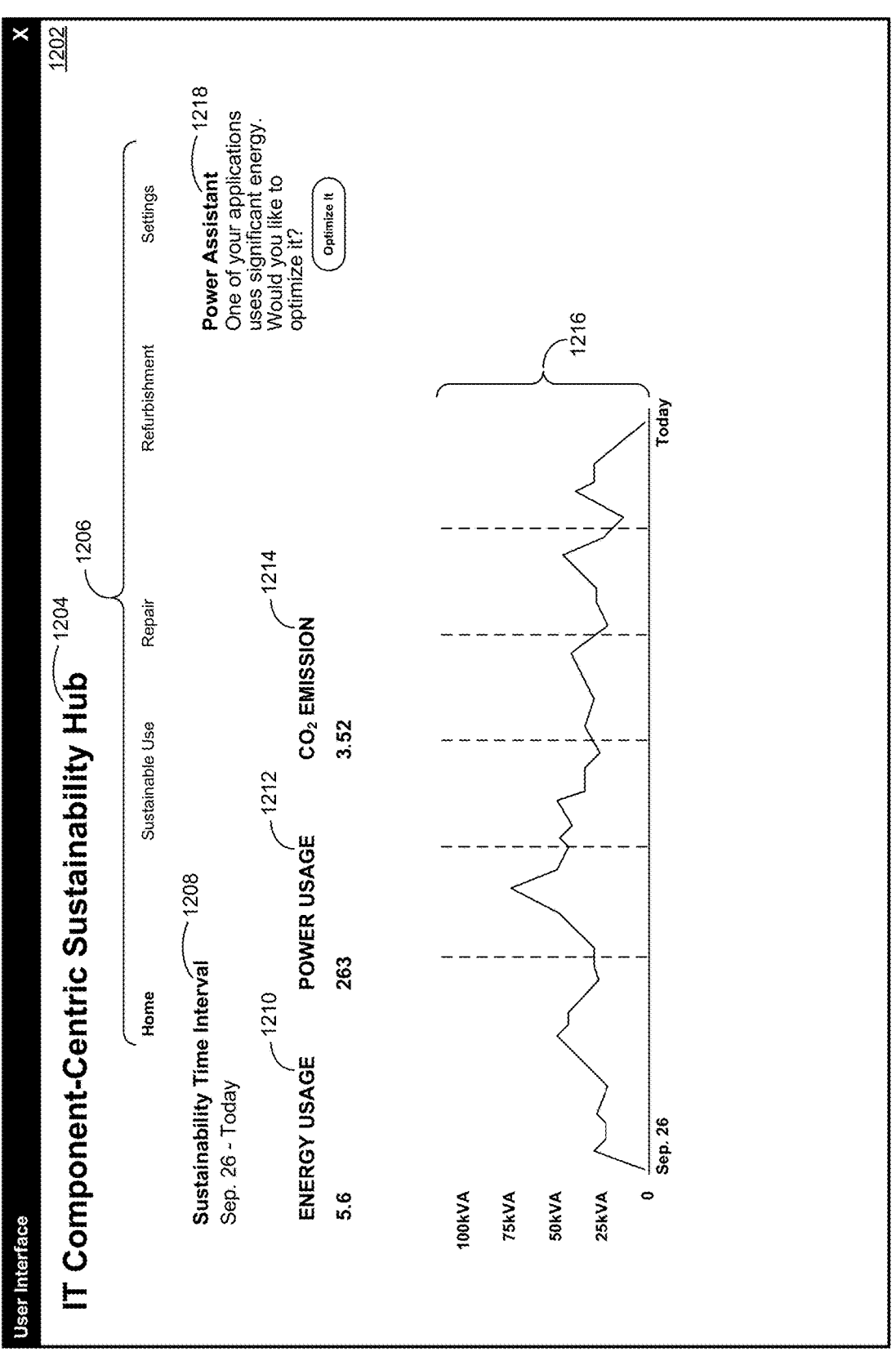
FIG. 12 shows a UI implemented to provide certain IT component-centric sustainability information.

FIG. 12 shows a user interface (UI) implemented in accordance with an embodiment of the invention to provide certain information technology (IT) component-centric sustainability information. In various embodiments, certain IT sustainability information may be displayed within a UI 1202. In various embodiments, the UI 1202 may be implemented to include an "IT Component-Centric Sustainability Hub" 1204 window, which in certain embodiments may include a menu 1206.

In various embodiments, the "IT Component-Centric Sustainability Hub" 1204 window may be implemented to display certain IT component-centric sustainability information associated with a particular organization. In various embodiments, the IT sustainability information displayed within the "IT Component-Centric Sustainability Hub" 1204 window may be generated as a result of certain operations performed by an IT component-centric sustainability hub module, described in the descriptive text associated with FIG. 3. In various embodiments, the IT sustainability information provided by the IT sustainability dashboard module may be implemented to be displayed graphically within the "IT Component-Centric Sustainability Hub" 1204 window. For example, as shown in FIG. 12, the IT sustainability information displayed as a graph 1216 within the "IT Component-Centric Sustainability Hub" 1204 window may correlate to energy usage 1210, power usage 1212, and CO 2 emission 1214 information associated with a particular type, or class, of IT component over a particular sustainability time interval 1208. In certain embodiments, the IT sustainability information displayed within the "IT Component-Centric Sustainability Hub" 1204 window may likewise include an "Power Assistant" 1218 window, implemented to provide certain IT sustainability optimization information.

Figure 13:
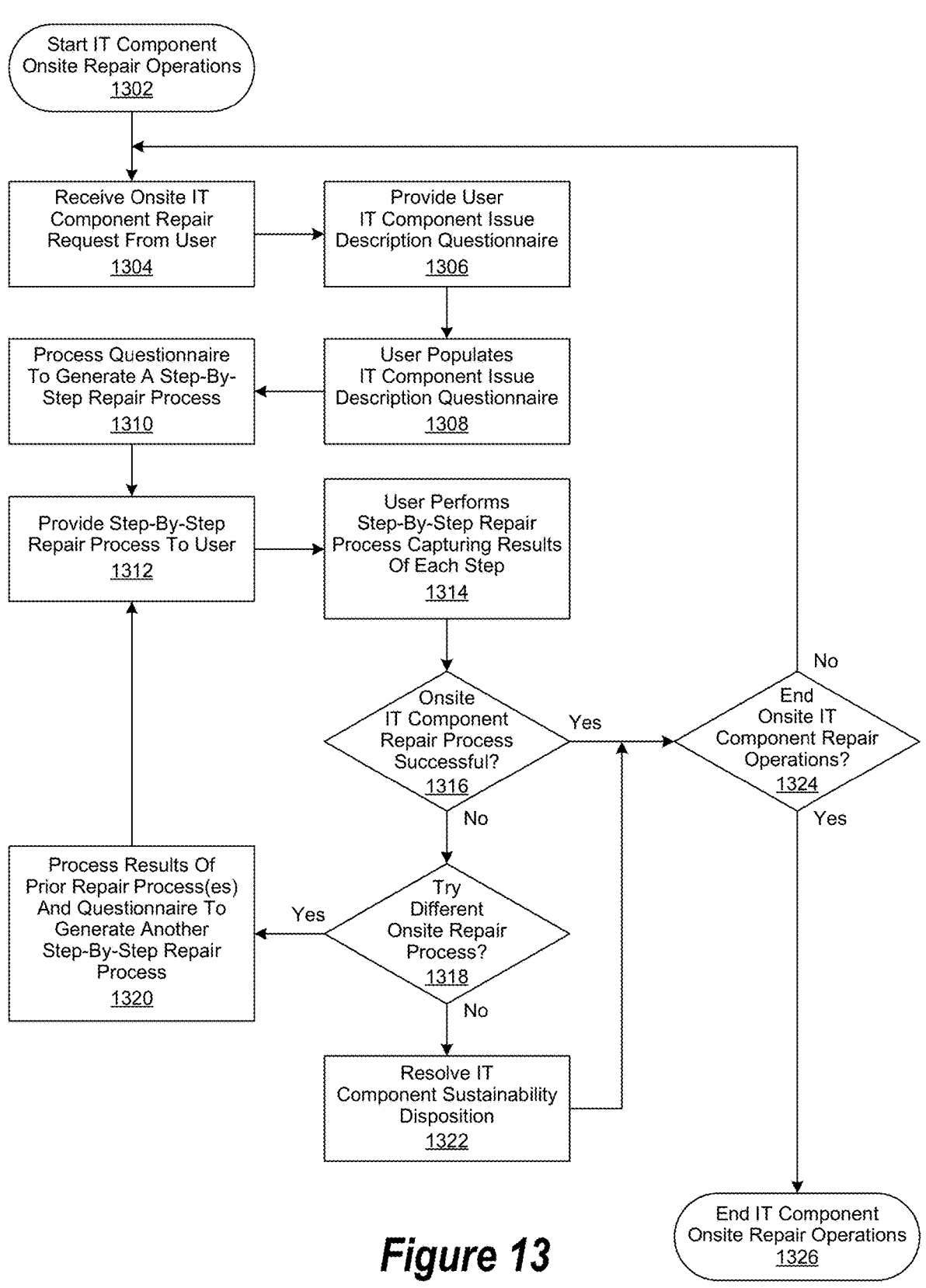
FIG. 13 is a flowchart showing the performance of certain IT component onsite repair operations.

FIG. 13 is a flowchart showing the performance of certain information technology (IT) component onsite repair operations implemented in accordance with an embodiment of the invention. In various embodiments, as described in greater detail herein, the implementation of IT component onsite repair operations may assist in reducing the impact of IT on the environment. In this embodiment, IT component onsite repair operations are begun in step 1302, followed by the receipt of a request from a user in step 1304 to repair a particular IT component, or one or more sub-components thereof.

In response, the user is provided an IT component issue description questionnaire in step 1306, which the user populates in step 1308. The populated questionnaire is then processed in step 1310 to generate an onsite step-by-step repair process, which is then provided to the user in step 1312. In this embodiment and others, the method by which the user is provided the questionnaire, the method by which it is populated by the user, the method by which it is processed to generate an onsite step-by-step repair process, and the method by which it provided to the user is a matter of design choice.

The user then performs the onsite step-by-step repair process in step 1314, capturing the results of each step as it is performed. In this embodiment and others, the method by which a user may be assisted in performing each step of the onsite repair process, and the method by which the results of each performed step is captured, is a matter of design choice. As an example, the onsite step-by-step repair process may be provided to the user via the use of a mobile phone. In this example, the results of performing each step may be entered into the phone by the user. Skilled practitioners of the art will recognize that many such methods are possible. Accordingly, the foregoing is not intended to limit the spirit, scope, or intent of the invention.

A determination is then made in step 1316 whether performance of the onsite step-by-step repair process has been successful. If so, then a determination is made in step 1324 whether to end IT component onsite repair operations. If not, then the process is continued, proceeding with step 1304. Otherwise, IT component onsite repair operations are ended in step 1326.

However, if it was determined in step 1316 that performance of the onsite step-by-step repair process was not successful, then a determination is made in step 1318 whether to try a different onsite step-by-step repair process. If so, then the results of prior onsite step-by-processes, and the user's responses to the IT component issue questionnaire, are processed in step 1320 to generate a different onsite step-by-step repair process. Thereafter, the process is continued, proceeding with step 1312. However, if it was determined in step 1318 that the onsite step-by-step repair process was unsuccessful, then the sustainability disposition of the IT component is resolved in step 1322 and the process is continued, proceeding with step 1324.

FIG. 14 shows a user interface (UI) implemented in accordance with an embodiment of the invention to provide certain information technology (IT) component second life planning information. In various embodiments, certain IT sustainability information may be displayed within a UI 1402. In various embodiments, the UI 1402 may be implemented to include an "IT Component Second Life Planning" 1404 window. In various embodiments, the "IT Component Second Life Planning" 1404 window may be implemented to receive certain IT component input information, which may in turn be provided to an IT component second life planning module, described in the descriptive text associated with FIG. 3. In various embodiments, the IT sustainability component second life planning module may be implemented to process the IT component input information to generate certain IT sustainability information, which in certain embodiments may be displayed within the "IT Component Second Life Planning" 1204 window.

For example, as shown in FIG. 12, the IT component sustainability information may be provided within the "IT Component Second Life Planning" 1404 window in the form of an "IT Component Credit Overview" 1406 sub-window. As shown in FIG. 14, the IT sustainability information displayed within the "IT Component Credit Overview" 1406 sub-window may include certain financial credit 1410, next use 1412, and destination 1414 information associated with certain IT components 1408. In certain embodiments, the IT sustainability information displayed within the "IT Component Credit Overview" 1406 sub-window may likewise include a total available credit 1416 amount, which can be applied to procuring other IT components, or sub-components thereof.

Figure 15:
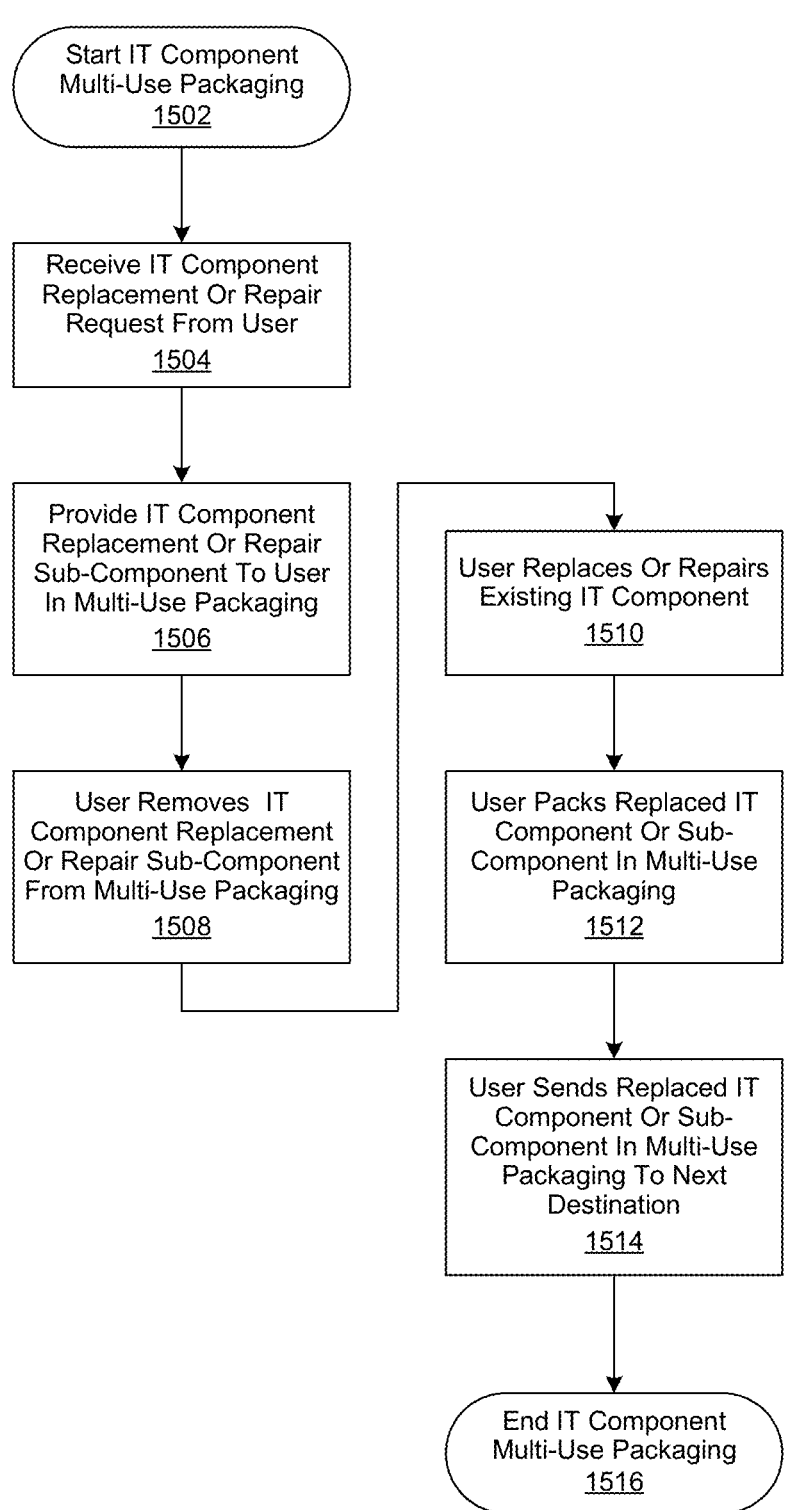
FIG. 15 is a flowchart showing the performance of certain IT component multi-use packaging operations.

FIG. 15 is a flowchart showing the performance of certain information technology (IT) component multi-use packaging operations implemented in accordance with an embodiment of the invention. In various embodiments, as described in greater detail herein, the implementation of multi-use packaging may assist in reducing the impact of IT on the environment. In certain of these embodiments, the implementation of multi-use packaging may facilitate the procurement, deployment, implementation, operation, management, maintenance, remediation, replacement, repurposing, reassignment, repair, reconfiguration, refurbishing, remanufacture, resale, recycling, or recovery, or a combination thereof, of a particular IT component, or a sub-component thereof.

In this embodiment, IT component multi-use packaging operations are begun in step 1502, followed by the receipt of a request from a user in step 1504 to repair or replace a particular IT component, or one or more sub-components thereof. In response, the user is provided the requested IT component, or sub-components thereof, in step 1506, packaged in multi-use packaging, described in greater detail herein. Upon its receipt, the user removes the requested replacement IT component, or repair sub-component(s), from the multi-use packaging in step 1508.

Once the requested replacement IT component, or repair sub-component(s), are removed from the multi-use packaging, the user replaces or repairs their existing IT component in step 1510. Once the IT component has been replaced or repaired, the user packs the replaced IT component, or subcomponent(s) in the multi-use packaging in step 1512. The user then sends the replaced IT component, or subcomponent(s), in the multi-use packaging to its next destination, such as an IT component repair center. IT component multi-use packaging operations are then ended in step 1516.

Figure 16:
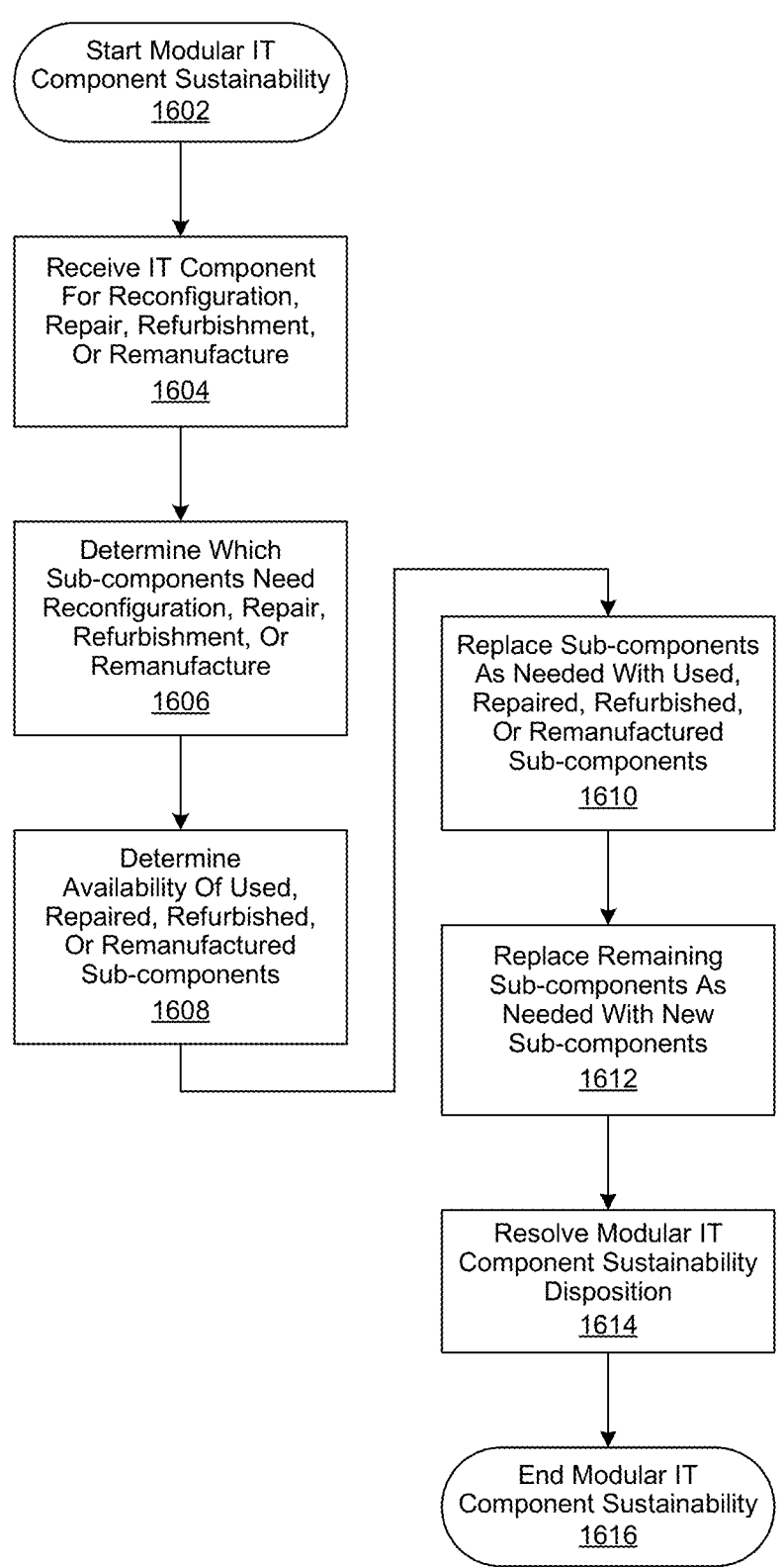
FIG. 16 is a flowchart showing the performance of certain modular IT component sustainability operations.
Figure 17A:
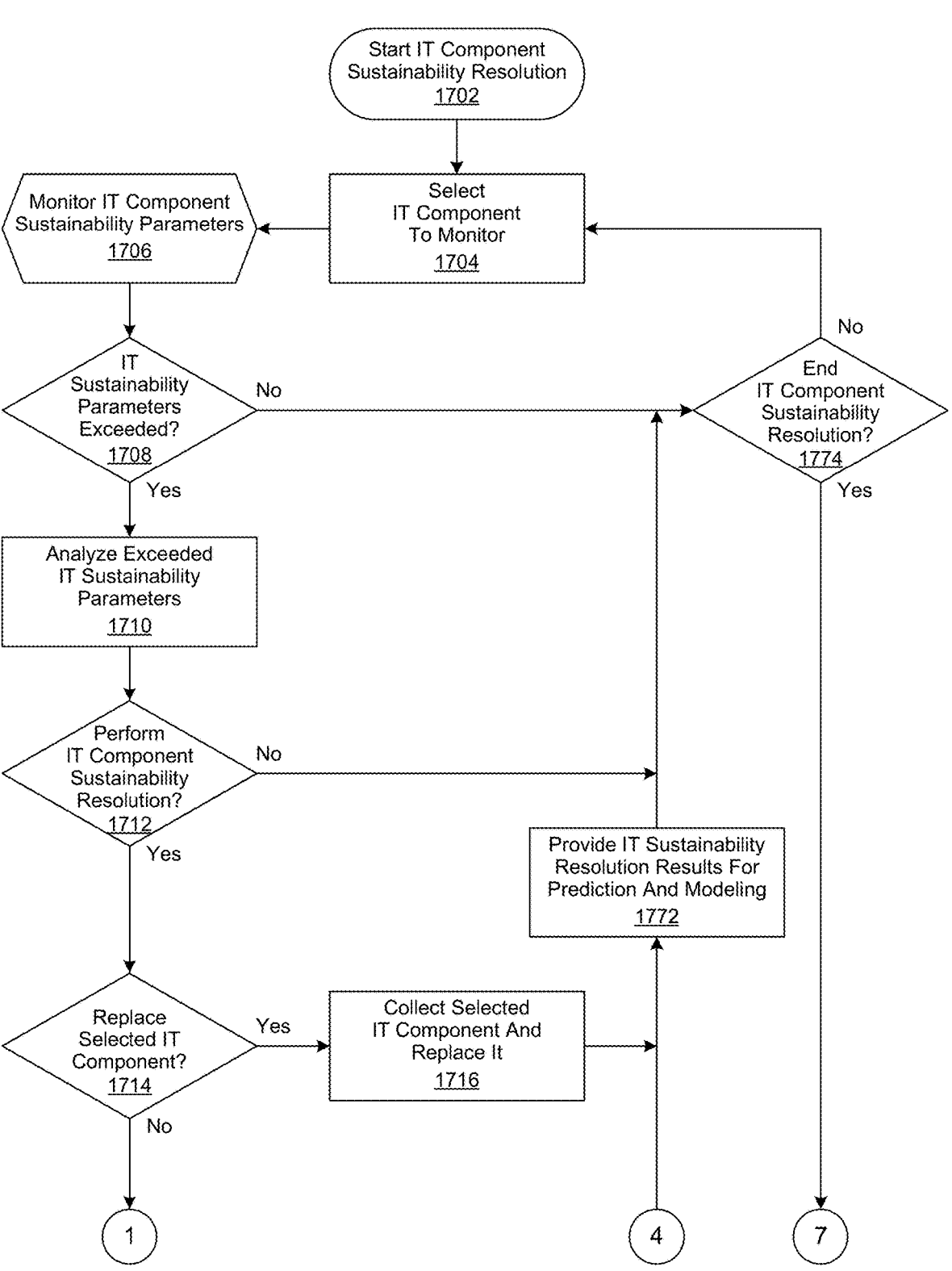
FIGS. 17*a* through 17*d* are a flowchart showing the performance of certain IT component sustainability resolution operations.
Figure 17B:
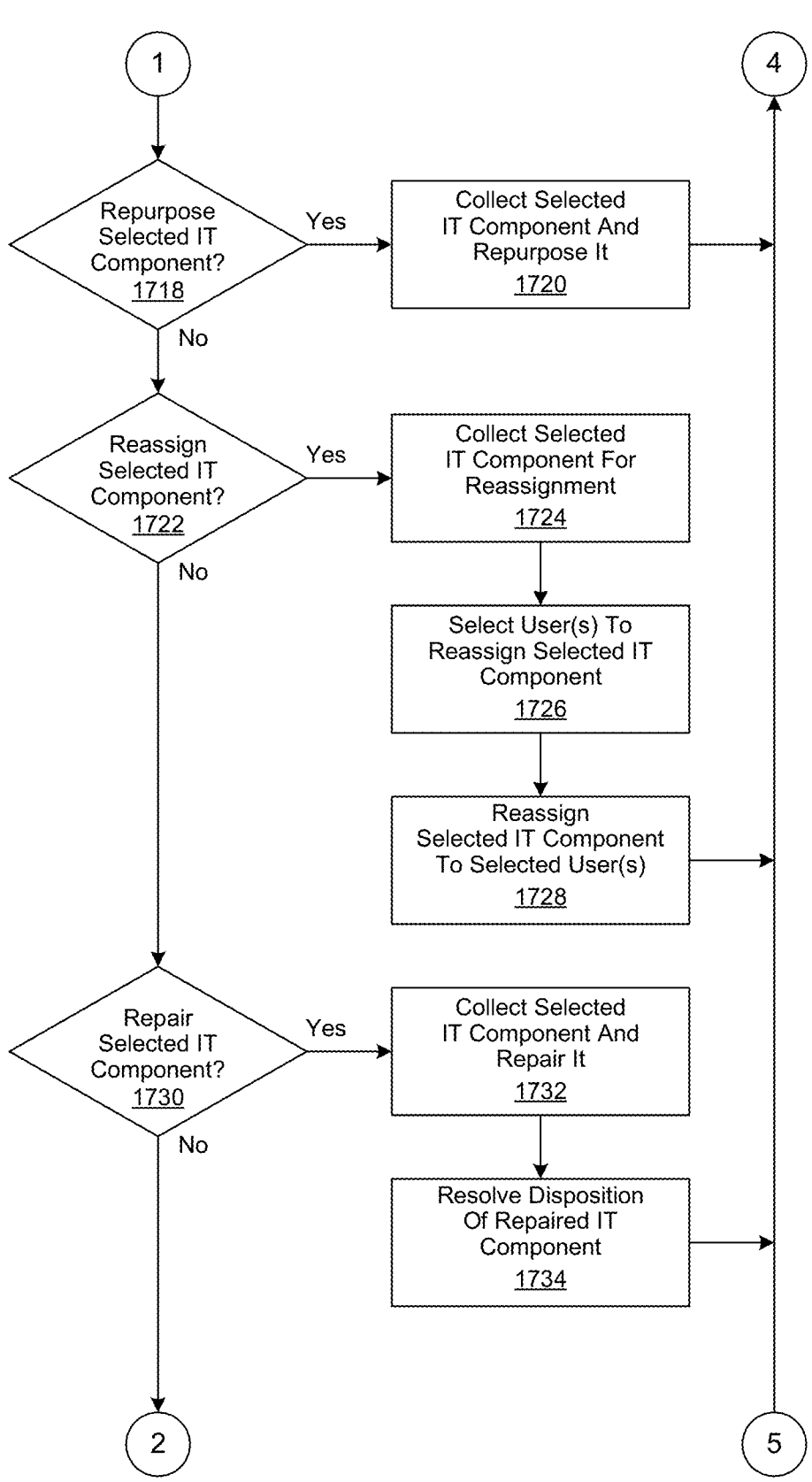
Figure 17C:
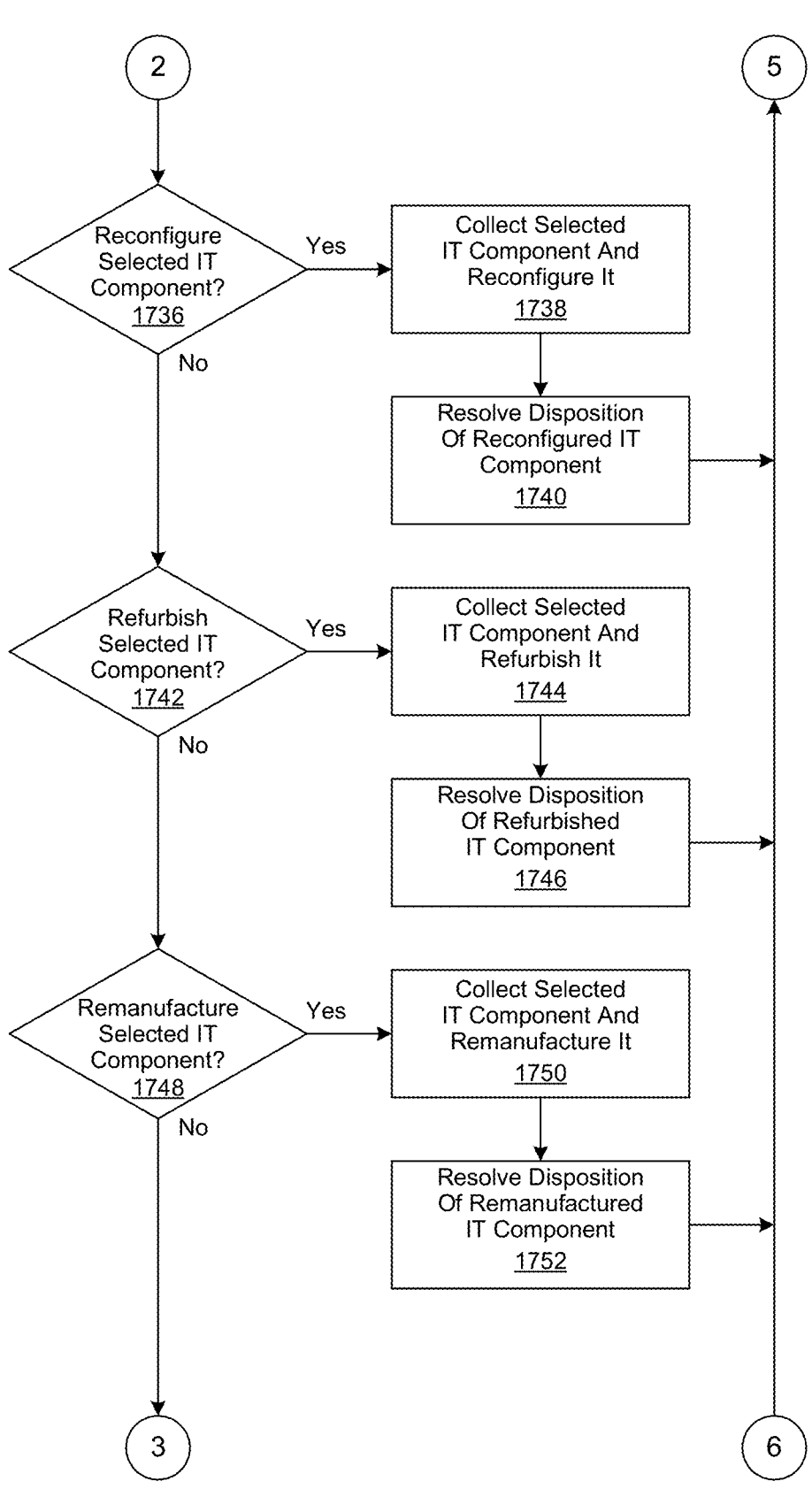
Figure 17D:
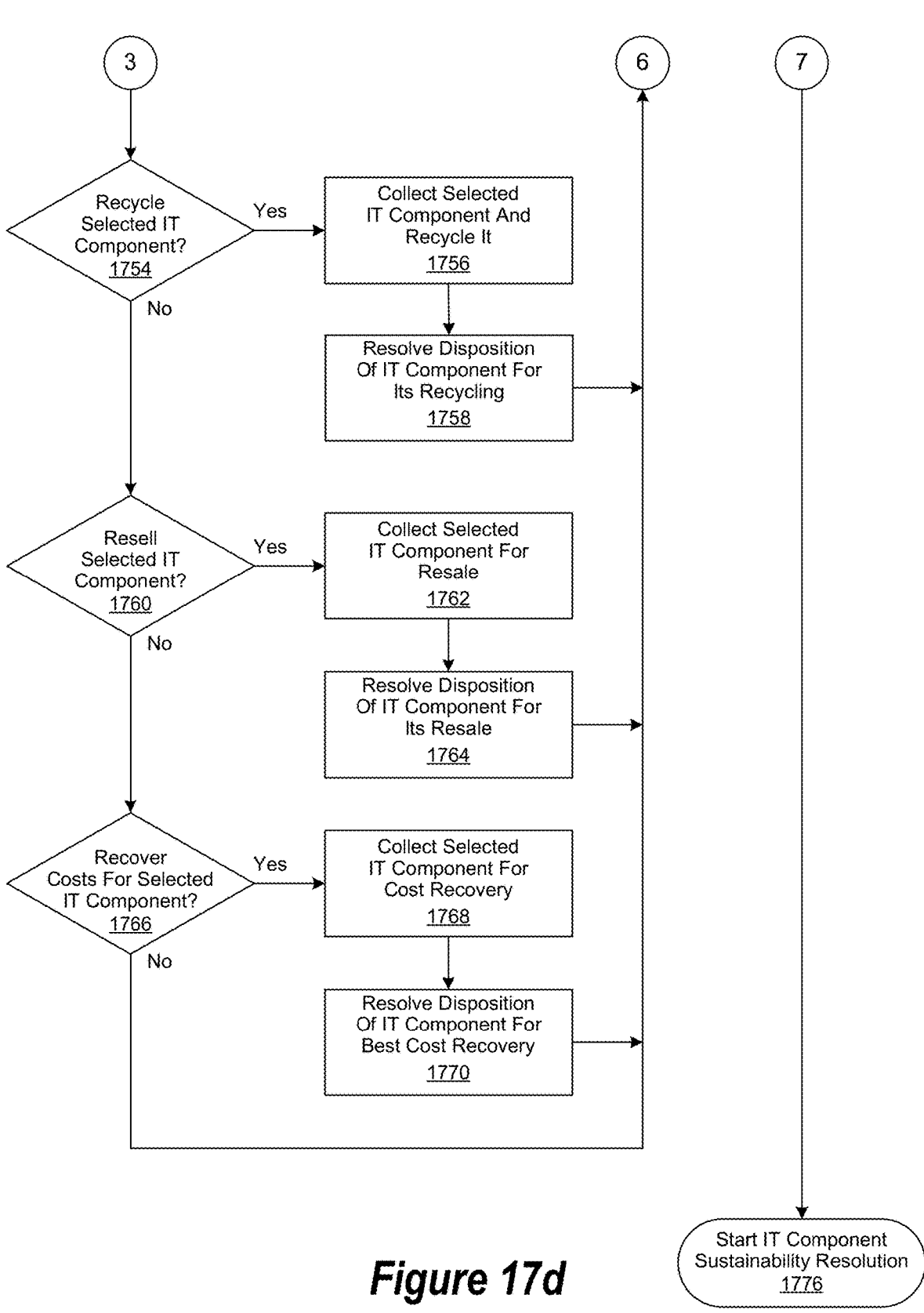

FIG. 16 is a flowchart showing the performance of certain modular information technology (IT) component sustainability operations implemented in accordance with an embodiment of the invention. In various embodiments, as described in greater detail herein, an IT component may be manufactured according to a modular component architecture. In certain of these embodiments, the implementation of such a modular component architecture may facilitate the procurement, deployment, implementation, operation, management, maintenance, remediation, replacement, repurposing, reassignment, repair, reconfiguration, refurbishing, remanufacture, resale, recycling, or recovery, or a combination thereof, of a particular IT component, or a sub-component thereof.

In this embodiment, modular IT component sustainability operations are begun in step 1602, followed by the receipt of a modular IT component in step 1604 for reconfiguration, repair, refurbishment, or remanufacture. A determination is then made in step 1606 which sub-components of the modular IT component may need reconfiguration, repair, refurbishment, or remanufacturing. Thereafter, a determination is made in step 1608 whether certain used, repaired, refurbished, or remanufactured sub-components may be available for use in reconfiguring, repairing, refurbishing, or remanufacturing the received modular IT component.

If they are, they are then used in step 1610, as needed, to replace their corresponding sub-component in the received modular IT component. Thereafter, new sub-components are used in step 1612 to replace any remaining sub-components that may need to be replaced. The sustainability disposition of the reconfigured, repaired, refurbished, or remanufactured modular IT component is then resolved in step 1614. As an example, it may be repurposed, reassigned, or resold. Likewise, any of its replaced sub-components may be repurposed, reassigned, reconfigured, refurbished, remanufactured, recycled, resold, or recovered, or a combination thereof, as described in greater detail herein. Modular IT component sustainability operations are then ended in step 1616.

FIGS. 17a through 17d are a flowchart showing the performance of certain information technology (IT) component sustainability resolution operations implemented in accordance with an embodiment of the invention. In various embodiments, one or more IT component sustainability operations, described in greater detail herein, may be performed within a circular IT component sustainability ecosystem, likewise described in greater detail herein. In this embodiment, IT component sustainability resolution operations are begun in step 1702, followed by the selection of a particular IT component to monitor in step 1704. Ongoing operations are then performed in step 1706 to monitor certain IT sustainability parameters, described in greater detail herein, associated with the selected IT component. In this and other embodiments, the IT sustainability parameters selected to be monitored, and the method by which they are monitored, is a matter of design choice.

A determination is then made in step 1708 whether any of the IT sustainability parameters associated with the selected IT component have been exceeded. If not, then a determination is made in step 1774 whether to end IT component sustainability resolution operations. If not, then the process is continued, proceeding with step 1702. Otherwise, IT component sustainability resolution operations are ended in step 1776. However, if it was determined in step 1708 that one of more of the IT sustainability parameters associated with the selected IT component have been exceeded, then they are analyzed in step 1710. The results of the analysis exceeded IT component sustainability parameters performed in step 1710 are then used in step 1712 to make a determination whether to perform an IT component sustainability resolution operation. If not, then the process is continued, proceeding with step 1772.

However, if it was determined in step 1712 to perform an IT component resolution operation, then a determination is made in step 1714 whether to replace the selected IT component. If so, then the selected IT component is collected, and then replaced with a replacement IT component, in step 1716. The results of the IT component resolution operation associated with replacing the selected IT component are then used in step 1770 for IT sustainability prediction and modeling operations, described in greater detail herein. The process is then continued, proceeding with step 1772. However, if it was determined in step 1714 to not replace the selected IT component, then a determination is made in step 1718 whether to repurpose the selected IT component. If so, then the selected IT component is collected, and then repurposed, as described in greater detail herein, in step 1720. The process is then continued, proceeding with step 1772.

However, if it was determined in step 1718 to not repurpose the selected IT component, then a determination is made in step 1722 whether to reassign the selected IT component. If so, then the selected IT component is collected for reassignment in step 1724. Thereafter, one or more users are selected in step 1726 for reassignment of the selected IT component, followed by the IT component being reassigned to the selected user(s), as described in greater detail herein, in step 1728. The process is then continued, proceeding with step 1772. However, if it was determined in step 1722 to not reassign the selected IT component, then a determination is made in step 1730 whether to repair the selected IT component. If so, then the selected IT component is collected, and then repaired, as described in greater detail herein, in step 1732. The disposition of the repaired IT component is then determined in step 1734, as likewise described in greater detail herein, followed by the process being continued, proceeding with step 1772.

However, if it was determined in step 1730 to not repair the selected IT component, then a determination is made in step 1736 whether to reconfigure the selected IT component. If so, then the selected IT component is collected, and then reconfigured, as described in greater detail herein, in step 1738. The disposition of the reconfigured IT component is then determined in step 1740, as likewise described in greater detail herein, followed by the process being continued, proceeding with step 1772. However, if it was determined in step 1736 to not reconfigure the selected IT component, then a determination is made in step 1742 whether to refurbish the selected IT component. If so, then the selected IT component is collected, and then refurbished, as described in greater detail herein, in step 1744. The disposition of the reconfigured IT component is then determined in step 1746, as likewise described in greater detail herein, followed by the process being continued, proceeding with step 1772.

However, if it was determined in step 1742 to not refurbish the selected IT component, then a determination is made in step 1748 whether to remanufacture the selected IT component. If so, then the selected IT component is collected, and then remanufactured, as described in greater detail herein, in step 1750. The disposition of the remanufactured IT component is then determined in step 1752, as likewise described in greater detail herein, followed by the process being continued, proceeding with step 1772. However, if it was determined in step 1748 to not remanufacture the selected IT component, then a determination is made in step 1754 whether to recycle the selected IT component. If so, then the selected IT component is collected, and then recycled, as described in greater detail herein, in step 1756. The disposition of the recycled IT component is then determined in step 1758, as likewise described in greater detail herein, followed by the process being continued, proceeding with step 1772.

However, if it was determined in step 1754 to not recycle the selected IT component, then a determination is made in step 1760 whether to resell the selected IT component. If so, then the selected IT component is collected for resale, as described in greater detail herein, in step 1762. The disposition of the IT component to be resold is then determined in step 1764, as likewise described in greater detail herein, followed by the process being continued, proceeding with step 1772. However, if it was determined in step 1760 to not resell the selected IT component, then a determination is made in step 1766 whether to recover costs for the selected IT component. If so, then the selected IT component is collected for cost recovery, as described in greater detail herein, in step 1768. The disposition of the recycled IT component for its best cost recovery is then determined in step 1758, as likewise described in greater detail herein, followed by the process being continued, proceeding with step 1772. Otherwise, the process is continued, proceeding with step 1772.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A method for performing an information technology (IT) ecosystem management and monitoring operation, comprising:

executing a sustainability application on a hardware processor of an information handling system, the information handling system being located within an IT ecosystem, the information handling system comprising a modular component architecture, the modular component architecture being configured with a collection of sub-components, the collection of sub-components being configured to be connected together in a modular configuration, the modular component architecture being configured such that a sub-component of the information handling system can be replaced without affecting other sub-components of the information handling system;

obtaining sustainability information regarding the information handling system via the sustainability application;

providing an IT ecosystem monitoring and management console, the IT ecosystem monitoring and management console comprising an IT ecosystem sustainability system, the IT ecosystem sustainability system comprising a sustainability component, the sustainability component communicating with the sustainability application to perform a sustainability operation, the sustainability operation comprising a circular sustainability operation, the circular sustainability operation including procurement, deployment, implementation, operation, management, maintenance, remediation, replacement, repurposing, reassignment, repair, reconfiguration, refurbishment, remanufacture, resale, recycling, or recovery, or a combination thereof, of a particular IT component or sub-component, throughout a lifecycle of the IT component to reduce an impact of the IT component on the environment, the circular sustainability operation including a predict and model step, a subscribe step, a deploy step, a support step, a use step, and a sustain step, the predict and model step being performed to establish requirements, standards and goals for the procurement, deployment, implementation, operation, management, maintenance, remediation, replacement, repurposing, reassignment, repair, reconfiguration, refurbishment, remanufacture, resale, recycling, or recovery, or a combination thereof, of a particular IT component, the subscribe step and the deploy step being performed individually or in combination, to reduce the amount of waste at typical end-of-life (EOL) for the particular IT component by creating additional options for procurement, deployment, implementation, operation, management, maintenance, remediation, replacement, repurposing, reassignment, repair, reconfiguration, refurbishment, remanufacture, resale, recycling, or recovery, or a combination thereof, of the particular IT component, the support step and the use step being performed individually or in combination, to achieve IT sustainability servicing goals, the sustain step, being performed individually or in combination with the predict and model step to predict a carbon footprint associated with procurement, deployment, implementation, operation, management, maintenance, remediation, replacement, repurposing, reassignment, repair, reconfiguration, refurbishment, remanufacture, resale, recycling, or recovery, or a combination thereof, of the particular IT component over a lifecycle of the particular IT component; and, communicating between the sustainability component of the IT ecosystem monitoring and management console and the sustainability application of the information handling system via a network to perform an IT inventory sustainability planning operation, the communicating providing the sustainability component with the sustainability information regarding the information handling system.

2. The method of claim 1, wherein:

the sustainability component comprises an IT inventory planning component; and, the IT inventory planning component performs the IT inventory sustainability planning operation.

3. The method of claim 2, wherein:

the IT inventory planning component comprises a sustainability goal setting module;

the IT inventory sustainability planning operation comprises a sustainability goal setting operation; and, the sustainability goal setting module performs the sustainability goal setting operation, the sustainability goal setting operation generating sustainability goals for a particular user, the sustainability goals comprising actional metrics to measure sustainability performance of the IT ecosystem of the particular user.

4. The method of claim 2, wherein:

the IT inventory planning component comprises a sustainability scorecard module;

the IT inventory sustainability planning operation comprises a sustainability scorecard operation; and, the sustainability scorecard module performs the sustainability scorecard operation, the sustainability scorecard operation generating a sustainability scorecard representing a measure of the sustainability performance of the IT ecosystem.

5. The method of claim 2, wherein:

the IT inventory planning component comprises an IT component inventory recommendation module;

the IT inventory sustainability planning operation comprises an IT component inventory recommendation operation; and, the IT inventory recommendation module performs the IT component inventory recommendation operation, the IT component inventory recommendation operation presenting an IT component inventory recommendation to address a particular sustainability goal.

6. The method of claim 2, wherein:

the IT inventory planning component comprises an IT inventory data service recommendation module;

the IT inventory sustainability planning operation comprises an IT inventory data service operation; and, the IT inventory data service module performs the IT inventory data service operation, the IT inventory data service operation generating sustainability focused data for use in tracking progress relative to a particular sustainability goal.

7. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

providing a sustainability application to an information handling system, the information handling system being located within an IT ecosystem, the information handling system comprising a modular component architecture, the modular component architecture being configured with a collection of sub-components, the collection of sub-components being configured to be connected together in a modular configuration, the modular component architecture being configured such that a sub-component of the information handling system can be replaced without affecting other sub-components of the information handling system;

obtaining sustainability information regarding the information handling system via the sustainability application;

providing an IT ecosystem monitoring and management console, the IT ecosystem monitoring and management console comprising an IT ecosystem sustainability system, the IT ecosystem sustainability system comprising a sustainability component, the sustainability component communicating with the sustainability application to perform a sustainability operation, the sustainability operation comprising a circular sustainability operation, the circular sustainability operation including procurement, deployment, implementation, operation, management, maintenance, remediation, replacement, repurposing, reassignment, repair, reconfiguration, refurbishment, remanufacture, resale, recycling, or recovery, or a combination thereof, of a particular IT component or sub-component, throughout a lifecycle of the IT component to reduce an impact of the IT component on the environment, the circular sustainability operation including a predict and model step, a subscribe step, a deploy step, a support step, a use step, and a sustain step, the predict and model step being performed to establish requirements, standards and goals for the procurement, deployment, implementation, operation, management, maintenance, remediation, replacement, repurposing, reassignment, repair, reconfiguration, refurbishment, remanufacture, resale, recycling, or recovery, or a combination thereof, of a particular IT component, the subscribe step and the deploy step being performed individually or in combination, to reduce the amount of waste at typical end-of-life (EOL) for the particular IT component by creating additional options for procurement, deployment, implementation, operation, management, maintenance, remediation, replacement, repurposing, reassignment, repair, reconfiguration, refurbishment, remanufacture, resale, recycling, or recovery, or a combination thereof, of the particular IT component, the support step and the use step being performed individually or in combination, to achieve IT sustainability servicing goals, the sustain step, being performed individually or in combination with the predict and model step to predict a carbon footprint associated with procurement, deployment, implementation, operation, management, maintenance, remediation, replacement, repurposing, reassignment, repair, reconfiguration, refurbishment, remanufacture, resale, recycling, or recovery, or a combination thereof, of the particular IT component over a lifecycle of the particular IT component; and, communicating between the sustainability component of the IT ecosystem monitoring and management console and the sustainability application of the information handling system via a network to perform an IT inventory sustainability planning operation, the communicating providing the sustainability component with the sustainability information regarding the information handling system.

8. The system of claim 7, wherein:

the sustainability component comprises an IT inventory planning component; and, the IT inventory planning component performs the IT inventory sustainability planning operation.

9. The system of claim 8, wherein:

the IT inventory planning component comprises a sustainability goal setting module;

the IT inventory sustainability planning operation comprises a sustainability goal setting operation; and, the sustainability goal setting module performs the sustainability goal setting operation, the sustainability goal setting operation generating sustainability goals for a particular user, the sustainability goals comprising actional metrics to measure sustainability performance of the IT ecosystem of the particular user.

10. The system of claim 8, wherein:

the IT inventory planning component comprises a sustainability scorecard module;

the IT inventory sustainability planning operation comprises a sustainability scorecard operation; and, the sustainability scorecard module performs the sustainability scorecard operation, the sustainability scorecard operation generating a sustainability scorecard representing a measure of the sustainability performance of the IT ecosystem.

11. The system of claim 8, wherein:

the IT inventory planning component comprises an IT component inventory recommendation module;

the IT inventory sustainability planning operation comprises an IT component inventory recommendation operation; and, the IT inventory recommendation module performs the IT component inventory recommendation operation, the IT component inventory recommendation operation presenting an IT component inventory recommendation to address a particular sustainability goal.

12. The system of claim 8, wherein:

the IT inventory planning component comprises an IT inventory data service recommendation module;

the IT inventory sustainability planning operation comprises an IT inventory data service operation; and, the IT inventory data service module performs the IT inventory data service operation, the IT inventory data service operation generating sustainability focused data for use in tracking progress relative to a particular sustainability goal.

13. A non-transitory, computer-readable storage medium embodying computer program code, the computer program code comprising computer executable instructions configured for:

providing a sustainability application to an information handling system, the information handling system being located within an IT ecosystem, the information handling system comprising a modular component architecture, the modular component architecture being configured with a collection of sub-components, the collection of sub-components being configured to be connected together in a modular configuration, the modular component architecture being configured such that a sub-component of the information handling system can be replaced without affecting other sub-components of the information handling system;

obtaining sustainability information regarding the information handling system via the sustainability application;

providing an IT ecosystem monitoring and management console, the IT ecosystem monitoring and management console comprising an IT ecosystem sustainability system, the IT ecosystem sustainability system comprising a sustainability component, the sustainability component communicating with the sustainability application to perform a sustainability operation, the sustainability operation comprising a circular sustainability operation, the circular sustainability operation including procurement, deployment, implementation, operation, management, maintenance, remediation, replacement, repurposing, reassignment, repair, reconfiguration, refurbishment, remanufacture, resale, recycling, or recovery, or a combination thereof, of a particular IT component or sub-component, throughout a lifecycle of the IT component to reduce an impact of the IT component on the environment, the circular sustainability operation including a predict and model step, a subscribe step, a deploy step, a support step, a use step, and a sustain step, the predict and model step being performed to establish requirements, standards and goals for the procurement, deployment, implementation, operation, management, maintenance, remediation, replacement, repurposing, reassignment, repair, reconfiguration, refurbishment, remanufacture, resale, recycling, or recovery, or a combination thereof, of a particular IT component, the subscribe step and the deploy step being performed individually or in combination, to reduce the amount of waste at typical end-of-life (EOL) for the particular IT component by creating additional options for procurement, deployment, implementation, operation, management, maintenance, remediation, replacement, repurposing, reassignment, repair, reconfiguration, refurbishment, remanufacture, resale, recycling, or recovery, or a combination thereof, of the particular IT component, the support step and the use step being performed individually or in combination, to achieve IT sustainability servicing goals, the sustain step, being performed individually or in combination with the predict and model step to predict a carbon footprint associated with procurement, deployment, implementation, operation, management, maintenance, remediation, replacement, repurposing, reassignment, repair, reconfiguration, refurbishment, remanufacture, resale, recycling, or recovery, or a combination thereof, of the particular IT component over a lifecycle of the particular IT component; and, communicating between the sustainability component of the IT ecosystem monitoring and management console and the sustainability application of the information handling system via a network to perform an IT inventory sustainability planning operation, the communicating providing the sustainability component with the sustainability information regarding the information handling system.

14. The non-transitory, computer-readable storage medium of claim 13, wherein:

the sustainability component comprises an IT inventory planning component; and, the IT inventory planning component performs the IT inventory sustainability planning operation.

15. The non-transitory, computer-readable storage medium of claim 14, wherein:

the IT inventory planning component comprises a sustainability goal setting module;

the IT inventory sustainability planning operation comprises a sustainability goal setting operation; and, the sustainability goal setting module performs the sustainability goal setting operation, the sustainability goal setting operation generating sustainability goals for a particular user, the sustainability goals comprising actional metrics to measure sustainability performance of the IT ecosystem of the particular user.

16. The non-transitory, computer-readable storage medium of claim 14, wherein:

the IT inventory planning component comprises a sustainability scorecard module;

the IT inventory sustainability planning operation comprises a sustainability scorecard operation; and, the sustainability scorecard module performs the sustainability scorecard operation, the sustainability scorecard operation generating a sustainability scorecard representing a measure of the sustainability performance of the IT ecosystem.

17. The non-transitory, computer-readable storage medium of claim 14, wherein:

the IT inventory planning component comprises an IT component inventory recommendation module;

the IT inventory sustainability planning operation comprises an IT component inventory recommendation operation; and, the IT inventory recommendation module performs the IT component inventory recommendation operation, the IT component inventory recommendation operation presenting an IT component inventory recommendation to address a particular sustainability goal.

18. The non-transitory, computer-readable storage medium of claim 14, wherein:

the IT inventory planning component comprises an IT inventory data service recommendation module;

the IT inventory sustainability planning operation comprises an IT inventory data service operation; and, the IT inventory data service module performs the IT inventory data service operation, the IT inventory data service operation generating sustainability focused data for use in tracking progress relative to a particular sustainability goal.

19. The non-transitory, computer-readable storage medium of claim 13, wherein:

the computer executable instructions are deployable to a client system from a server system at a remote location.

20. The non-transitory, computer-readable storage medium of claim 13, wherein:

the computer executable instructions are provided by a service provider to a user on an on-demand basis.

* * * * *